United States Patent
Matsen et al.

(10) Patent No.: US 10,966,292 B2
(45) Date of Patent: Mar. 30, 2021

(54) METHOD AND APPARATUS FOR FORMING MULTI-LAYERED METALLIC ARMOR

(71) Applicant: The Boeing Company, Chicago, IL (US)

(72) Inventors: Marc R. Matsen, Seattle, WA (US); Mark A. Negley, Kirkland, WA (US)

(73) Assignee: The Boeing Company, Chicago, IL (US)

(*) Notice: Subject to any disclaimer, the term of this patent is extended or adjusted under 35 U.S.C. 154(b) by 285 days.

(21) Appl. No.: 15/923,902

(22) Filed: Mar. 16, 2018

(65) Prior Publication Data

US 2019/0289681 A1 Sep. 19, 2019

(51) Int. Cl.
| | |
|---|---|
| *B22F 3/24* | (2006.01) |
| *H05B 6/10* | (2006.01) |
| *F41H 5/04* | (2006.01) |
| *B21B 1/26* | (2006.01) |
| *B22F 7/04* | (2006.01) |

(52) U.S. Cl.
CPC ............ *H05B 6/101* (2013.01); *B21B 1/265* (2013.01); *B22F 3/24* (2013.01); *B22F 7/04* (2013.01); *F41H 5/045* (2013.01); *H05B 6/105* (2013.01); *B22F 2003/247* (2013.01); *B22F 2202/05* (2013.01); *B22F 2301/35* (2013.01)

(58) Field of Classification Search
CPC ... F41H 5/045; B22F 7/04; B22F 3/24; H05B 6/101
See application file for complete search history.

(56) References Cited

U.S. PATENT DOCUMENTS

| | | | |
|---|---|---|---|
| 7,507,312 B2 | 3/2009 | Bossi et al. | |
| 8,343,402 B1* | 1/2013 | Matsen | B29C 35/0805 |
| | | | 264/109 |
| 8,556,619 B2 | 10/2013 | Matsen et al. | |
| 9,457,404 B2 | 10/2016 | Matsen et al. | |
| 9,930,729 B2 | 3/2018 | Matsen et al. | |

(Continued)

FOREIGN PATENT DOCUMENTS

| | | |
|---|---|---|
| GB | 2560509 | 9/2018 |
| WO | 2006137823 | 12/2006 |

OTHER PUBLICATIONS

U.S. Appl. No. 16/548,657, filed Aug. 22, 2019.
Extended European Search Report for European Patent Application No. 20171501.8 dated Oct. 1, 2020.

*Primary Examiner* — Scott R Kastler
(74) *Attorney, Agent, or Firm* — Kunzler Bean & Adamson

(57) ABSTRACT

Disclosed herein is a method of forming a multi-layered metallic part. The method comprises forming a plurality of ductile layers made of a metallic material having a first ductility. The method also comprises forming at least one high-strength powder layer made of a powdered metallic material having a second ductility higher than the first ductility. The method further comprises assembling the plurality of ductile layers and the at least one high-strength powder layer in an alternating and stacked formation to form a multi-layered metallic assembly. The method additionally comprises oscillating a crystallographic phase of the powdered metallic material of the at least one high-strength powder layer between a first crystallographic phase and a second crystallographic phase.

20 Claims, 12 Drawing Sheets

(56) References Cited

U.S. PATENT DOCUMENTS

2006/0266207 A1 11/2006 Cerny et al.
2009/0087681 A1 4/2009 Decker et al.
2015/0354924 A1* 12/2015 Micarelli ............... B32B 33/00
                                                                              89/36.01

* cited by examiner

METHOD AND APPARATUS FOR FORMING MULTI-LAYERED METALLIC ARMOR

CROSS-REFERENCE TO RELATED APPLICATIONS

This application is related to U.S. patent application Ser. No. 13/758,609, filed Feb. 4, 2013, and U.S. patent application Ser. No. 14/697,418, filed Apr. 27, 2015, which are incorporated herein by reference.

FIELD

This disclosure relates generally to forming materials into desired shapes, and more particularly to forming a multi-layered metallic assembly into desired shapes using high-strength magnetic fields.

BACKGROUND

High-strength materials, such as hardened steel, are used in a variety of applications. In one application, high-strength steel plates are used as armor for vehicles, weapons, personnel, structures, and the like. Desirably, high-strength steel plates are thick and strong in order to withstand powerful impacts, which makes the formation of such steel plates into desired shapes difficult.

SUMMARY

The subject matter of the present application provides embodiments of methods and systems for forming a multi-layered metallic part and corresponding multi-layered metallic parts that overcome the above-discussed shortcomings of prior art techniques. The subject matter of the present application has been developed in response to the present state of the art, and in particular, in response to shortcomings of conventional high-strength metallic parts, such as high-strength steel plates, and the conventional methods and systems for forming such parts.

Disclosed herein is a method of forming a multi-layered metallic part. The method comprises forming a plurality of ductile layers made of a metallic material having a first ductility. The method also comprises forming at least one high-strength powder layer made of a powdered metallic material having a second ductility lower than the first ductility. The method further comprises assembling the plurality of ductile layers and the at least one high-strength powder layer in an alternating and stacked formation to form a multi-layered metallic assembly. The method additionally comprises oscillating a crystallographic phase of the powdered metallic material of the at least one high-strength powder layer between a first crystallographic phase and a second crystallographic phase. The preceding subject matter of this paragraph characterizes example 1 of the present disclosure.

Oscillating the crystallographic phase of the powdered metallic material of the at least one high-strength powder layer comprises changing a phase transformation temperature of the powdered metallic material of the at least one high-strength powder layer. The preceding subject matter of this paragraph characterizes example 2 of the present disclosure, wherein example 2 also includes the subject matter according to example 1, above.

Before oscillating the crystallographic phase, the method further comprises heating the at least one high-strength powder layer to a temperature higher than the phase transformation temperature corresponding with the first crystallographic phase. The preceding subject matter of this paragraph characterizes example 3 of the present disclosure, wherein example 3 also includes the subject matter according to example 2, above.

Changing the phase transformation temperature of the powdered metallic material of the at least one high-strength powder layer comprises holding constant a temperature of the at least one high-strength powder layer and, while holding constant the temperature of the at least one high-strength powder layer, applying a magnetic field to the at least one high-strength powder layer to increase the phase transformation temperature of the powdered metallic material higher than the temperature of the at least one high-strength powder layer. The preceding subject matter of this paragraph characterizes example 4 of the present disclosure, wherein example 4 also includes the subject matter according to example 3, above.

Oscillating the crystallographic phase of the powdered metallic material of the at least one high-strength powder layer comprises increasing a temperature of the at least one high-strength powder layer above a phase transformation temperature of the powdered metallic material of the at least one high-strength powder layer. The preceding subject matter of this paragraph characterizes example 5 of the present disclosure, wherein example 5 also includes the subject matter according to any one of examples 1-4, above.

The powdered metallic material of the at least one high-strength powder layer is partially consolidated. Oscillating the crystallographic phase of the powdered metallic material of the at least one high-strength powder layer consolidates the powdered metallic material of the at least one high-strength powder layer. The preceding subject matter of this paragraph characterizes example 6 of the present disclosure, wherein example 6 also includes the subject matter according to any one of examples 1-5, above.

Forming the at least one high-strength powder layer comprises forming a plurality of high-strength powder layers. Assembling comprises assembling the plurality of ductile layers and the plurality of high-strength powder layers in an alternating and stacked formation such that two of the plurality of ductile layers comprise outer ductile layers, the outer ductile layers are joined together to define an enclosed interior cavity of the multi-layered metallic assembly, the plurality of high-strength powder layers and are sealed within the enclosed interior cavity, and at least one of the plurality of ductile layers comprises an inner ductile layer sealed within the enclosed interior cavity and interposed between the plurality of high-strength powder layers. The preceding subject matter of this paragraph characterizes example 7 of the present disclosure, wherein example 7 also includes the subject matter according to any one of examples 1-6, above.

The method further comprises purging the multi-layered metallic assembly of oxide-inducing elements by introducing a gas into the enclosed interior cavity while oscillating the crystallographic phase of the powdered metallic material of the at least one high-strength powder layer between the first crystallographic phase and the second crystallographic phase. The preceding subject matter of this paragraph characterizes example 8 of the present disclosure, wherein example 8 also includes the subject matter according to example 7, above.

The method further comprises trimming excess portions of the outer ductile layers after oscillating the crystallographic phase of the powdered metallic material of the at least one high-strength powder layer between the first crystallographic phase and the second crystallographic phase. The preceding subject matter of this paragraph characterizes example 9 of the present disclosure, wherein example 9 also includes the subject matter according to any one of examples 7-8, above.

The powdered metallic material comprises a steel powder. The first crystallographic phase is a austenite crystallographic phase. The second crystallographic phase is a ferrite and cementite crystallographic phase. The method further comprises heating the high-strength powder layer above a phase transformation temperature corresponding with the austenite crystallographic phase of the steel powder and after oscillating the crystallographic phase of the powdered metallic material of the at least one high-strength powder layer between the austenite crystallographic phase and the ferrite and cementite crystallographic phase to form at least one high-strength consolidated layer, cooling the high-strength consolidated layer, while in the austenite crystallographic phase, at a cooling rate sufficient for the at least one high-strength consolidated layer to be in a martensitic crystallographic phase. The preceding subject matter of this paragraph characterizes example 10 of the present disclosure, wherein example 10 also includes the subject matter according to any one of examples 1-9, above.

The phase transformation temperature of the powdered metallic material is increased from between 1414° F. and 1430° F. to at least 1470° F. The preceding subject matter of this paragraph characterizes example 11 of the present disclosure, wherein example 11 also includes the subject matter according to example 10, above.

The steel powder comprises at least 0.80% carbon. The preceding subject matter of this paragraph characterizes example 12 of the present disclosure, wherein example 12 also includes the subject matter according to example 10, above.

The plurality of ductile layers and the at least one high-strength powder layer comprises a three dimensional (3-D) sub-feature. The 3-D sub-features collectively define a 3-D feature of the multi-layered metallic assembly. The preceding subject matter of this paragraph characterizes example 13 of the present disclosure, wherein example 13 also includes the subject matter according to any one of examples 1-12, above.

The plurality of ductile layers and the at least one high-strength powder layer is self-supportive and formed separately from one another. Assembling the plurality of ductile layers and the at least one high-strength powder layer in an alternating and stacked formation to form a multi-layered metallic assembly comprises stacking the plurality of ductile layers and the at least one high-strength powder layer on top of each other. The preceding subject matter of this paragraph characterizes example 14 of the present disclosure, wherein example 14 also includes the subject matter according to any one of examples 1-13, above.

The plurality of ductile layers is self-supportive and formed separately from one another. Assembling the plurality of ductile layers and the at least one high-strength powder layer in an alternating and stacked formation to form a multi-layered metallic assembly comprises delivering the powdered metallic material into spaces defined between adjacent ductile layers of the plurality of ductile layers. The preceding subject matter of this paragraph characterizes example 15 of the present disclosure, wherein example 15 also includes the subject matter according to any one of examples 1-13, above.

The method further comprises compressing the multi-layered metallic assembly during or after oscillating the crystallographic phase of the powdered metallic material of the at least one high-strength powder layer between the first crystallographic phase and the second crystallographic phase. The preceding subject matter of this paragraph characterizes example 16 of the present disclosure, wherein example 16 also includes the subject matter according to any one of examples 1-15, above.

Also disclosed herein is a multi-layered metallic armor apparatus. The apparatus comprises a plurality of ductile layers made of a first metallic material having a first ductility. The apparatus also comprises a plurality of high-strength consolidated layers made of a second metallic material having a second ductility lower than the first ductility. Each high-strength consolidated layer of the plurality of high-strength consolidated layers is sandwiched between two ductile layers of the plurality of ductile layers. An interface is defined between each high-strength consolidated layer of the plurality of high-strength consolidated layers and an adjacent ductile layer of the plurality of ductile layers. The preceding subject matter of this paragraph characterizes example 17 of the present disclosure.

The plurality of high-strength consolidated layers have a non-tempered martensite crystallographic phase or a tempered martensite crystallographic phase. The preceding subject matter of this paragraph characterizes example 18 of the present disclosure, wherein example 18 also includes the subject matter according to example 17, above.

The multi-layered metallic armor has a non-planar 3-D shape. The preceding subject matter of this paragraph characterizes example 19 of the present disclosure, wherein example 19 also includes the subject matter according to any one of examples 17-18, above.

Further disclosed herein is a system for forming a multi-layered metallic part. The system comprises a first portion comprising a first susceptor. The first susceptor comprises a first tool face shaped according to a desired shape of a first surface of the multi-layered metallic part. The system also comprises a second portion comprising a second susceptor. The second susceptor comprises a second tool face shaped according to a desired shape of a second surface of the multi-layered metallic part, wherein the first portion and the second portion are movable relative to each other to compress a multi-layered metallic assembly between the first susceptor and the second susceptor. The multi-layered metallic assembly comprises alternating and stacked ductile layers and high-strength powder layers. The system further comprises electromagnetic coils configured to apply a first magnetic field to the first susceptor and the second susceptor, and apply a second magnetic field to the multi-layered metallic assembly between the first susceptor and the second susceptor. The system additionally comprises a controller operably coupled to the first portion, the second portion, and the electromagnetic coils. The controller is configured to control a supply of electric power to the electromagnetic coils to generate the first magnetic field to heat the first susceptor and the second susceptor, to control a supply of electric power to the electromagnetic coils to intermittently generate the second magnetic field to oscillate a crystallographic phase of the high-strength powder layers between a first crystallographic phase and a second crystallographic phase and consolidate the high-strength powder layers, and to control the first portion and the second portion to move relative to each other to compress the multi-layered metallic assembly between the first susceptor and the second susceptor. The preceding subject matter of this paragraph characterizes example 20 of the present disclosure.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter, they are not therefore to be considered to be limiting of its scope. The subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
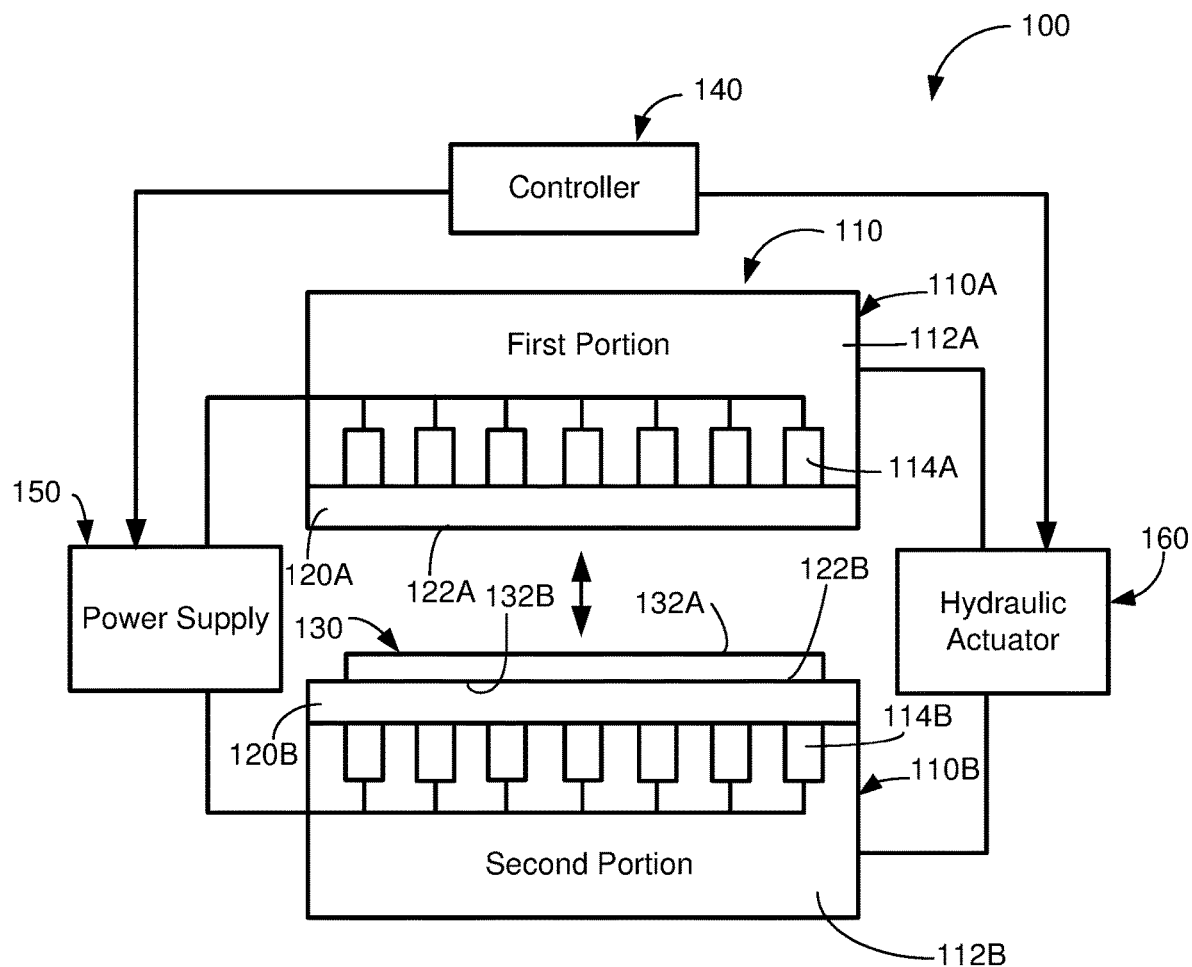
FIG. 1 is a schematic side view of a system for forming a multi-layered metallic assembly into a multi-layered metallic part with an apparatus of the system in a first configuration, according to one or more examples of the present disclosure.
Figure 2:
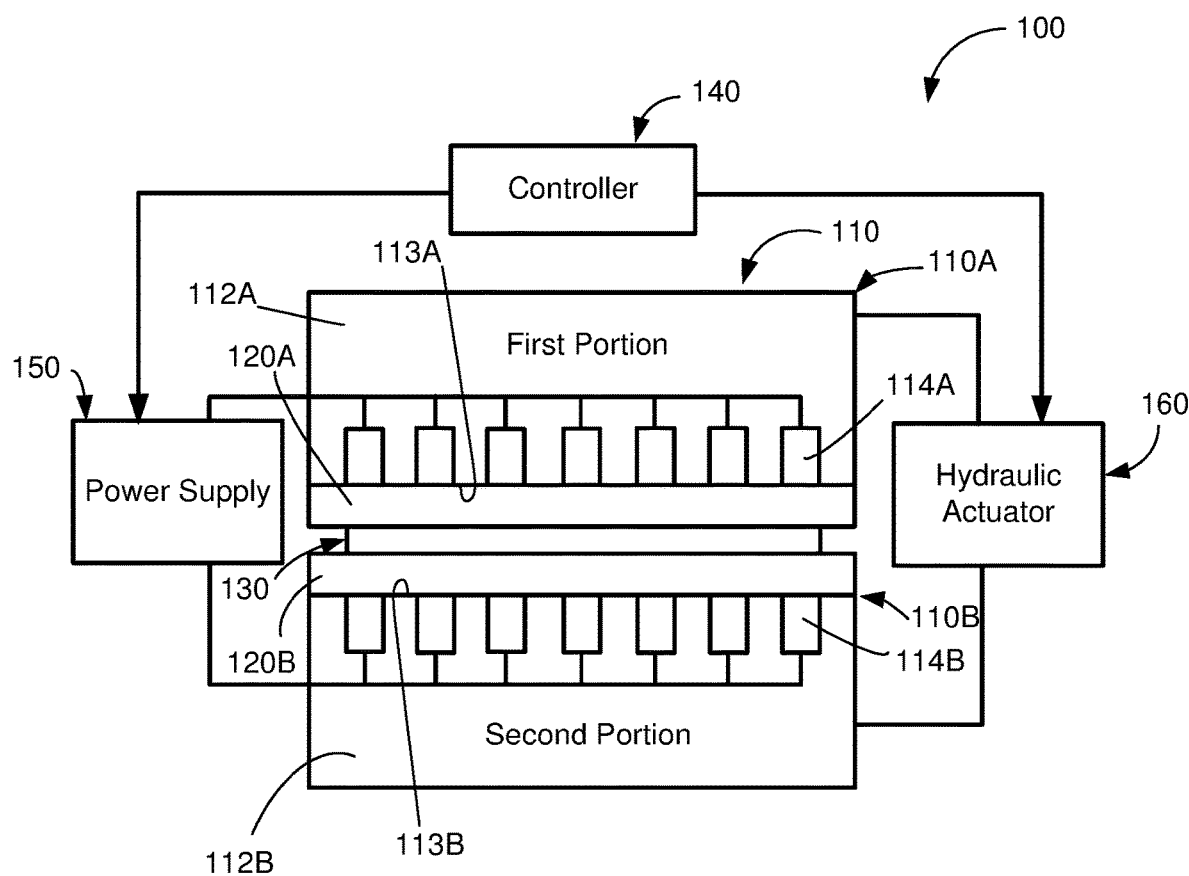
FIG. 2 is a schematic side view of the system of FIG. 1 with the apparatus of the system in a second configuration, according to one or more examples of the present disclosure.

Referring to FIGS. 1 and 2, and according to one embodiment, a system 100 for forming a multi-layered metallic assembly 130 (see, e.g., FIG. 7) into a multi-layered metallic part 131 (see, e.g., FIG. 8) is shown. In some implementations, the multi-layered metallic part 131 is multi-layered metallic armor for capturing and fracturing explosive rounds. The system 100 includes an apparatus 110 operably coupled to a controller 140, power supply 150, and hydraulic actuator 160. The apparatus 110 includes a first portion 110A and a second portion 110B. The first portion 110A and the second portion 110B are movable relative to each other. More specifically, the first portion 110A and the second portion 110B are movable toward and away from each other as indicated by the directional arrow in FIG. 1. Movement of the first portion 110A and the second portion 110B relative to each other can be facilitated by one or more actuators, such as the hydraulic actuator 160, as is known in the art. In some implementations, the first portion 110A includes an upper die 112A and the second portion 110B includes a lower die 112B.

Each of the upper die 112A and the lower die 112B can be made from any of various materials, such as, for example, metals, dielectrics, insulators, and combinations thereof. In one embodiment, one or both of the upper die 112A and the lower die 112B may include a lamination of alternating metal plates and dielectric spacers. The metal plates may be made from non-magnetic austenitic nickel/chromium-based stainless steels or superalloys. In one implementation, one or more dielectric spacers terminate a distance away from interface surfaces 113A, 113B of the upper die 112A and the lower die 112B, respectively, such that only the metal plates define the interface surface of the upper die 112A and the lower die 112B. Additionally, in this manner, air gaps are provided between the portions of the metal plates proximate the interface surfaces 113A, 113B of the upper die 112A and the lower die 112B, which facilitate cooling of susceptors 120A, 120B described below.

At least one of the first portion 110A and second portion 110B includes one or more electromagnetic coils operable to generate a magnetic field. In the illustrated embodiment, the first portion 110A includes a plurality of electromagnetic coils 114A and the second portion 110B includes a plurality of electromagnetic coils 114B. In certain implementations, each of the electromagnetic coils 114A, 114B is a complete, fully functional, electromagnetic coil. However, in some implementations, each of the electromagnetic coils 114A of the first portion 110A is a portion (e.g., first half) of an electromagnetic coil, and each of the electromagnetic coils 114B of the second portion 110B is another portion (e.g., second half) of an electromagnetic coil. When the first portion 110A and second portion 110B are brought together, each of the electromagnetic coils 114A or first halves engage respective electromagnetic coils 114B or second halves to form a fully functional electromagnetic coil.

Whether forming a portion of an electromagnetic coil, or the entirety of an electromagnetic coil, each of the electromagnetic coils 114A, 114B is operable independently of the other electromagnetic coils in some embodiments, or co-dependently with the other electromagnetic coils in other embodiments to generate a magnetic field. Each of the electromagnetic coils 114A, 114B can be the entirety of, or a portion of, any of various electromagnetic coils. Generally, an electromagnetic coil includes a wire made from an electrical conductor and shaped into a coil, spiral, or helix. For example, in one implementation, each one of the electromagnetic coils 114A, 114B is made from lightly drawn copper tubing. As an electric current is passed through the coiled wire, a magnetic field is induced that emanates away from the coiled rod. The intensity of the magnetic field (e.g., magnetic flux) generated by an electromagnetic coil is dependent on the strength of the current applied to the coiled wire.

Figure 3:
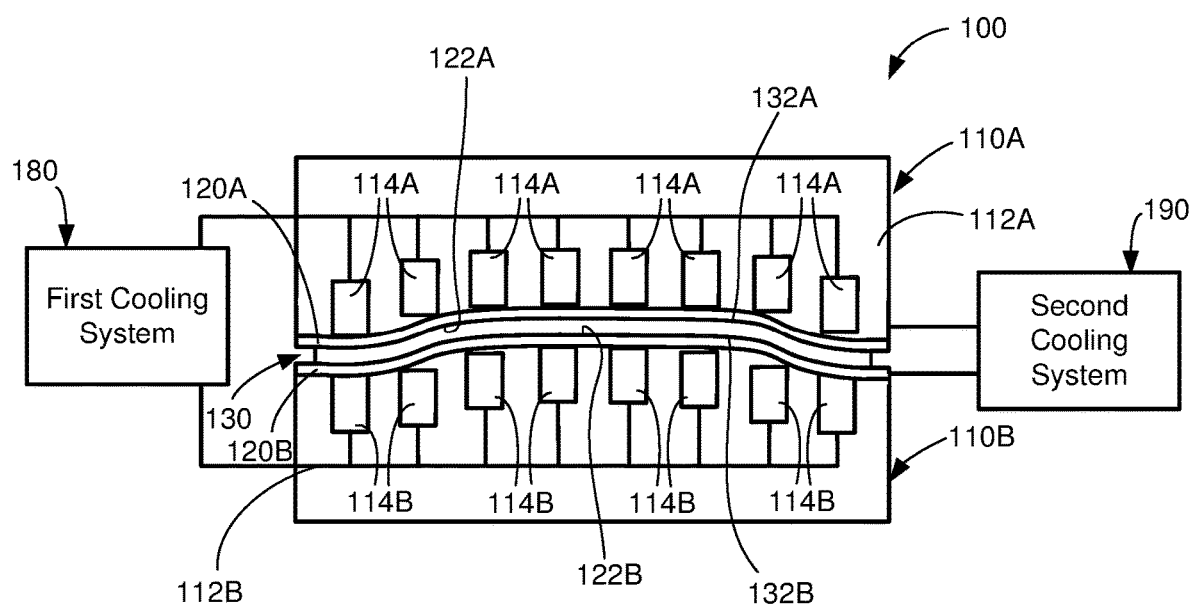
FIG. 3 is a schematic side view of a system for forming a multi-layered metallic assembly into a multi-layered metallic part, according to one or more examples of the present disclosure.

The electromagnetic coils 114A, 114B are coupled to the upper die 112A and the lower die 112B, respectively. In some embodiments, as shown, the electromagnetic coils 114A, 114B are embedded within the upper die 112A and the lower die 112B, respectively. For example, the upper die 112A and the lower die 112B may include a plurality of cavities for receiving a respective one of the electromagnetic coils 114A, 114B. As shown in FIG. 3, the cavities, and thus the electromagnetic coils 114A, 114B, formed in each of the upper die 112A and the lower die 112B may be positioned in the die based on the contour of the corresponding one of the interface surfaces 113A, 113B of the die and first tool face 122A and the second tool face 122B of the susceptors 120A, 120B. More specifically, the cavities and electromagnetic coils are arranged in the upper die 112A and the lower die 112B to complement the shape of the contoured surfaces of the dies and susceptors. In this manner, the electromagnetic coils 114A, 114B are positioned a more uniform distance away from the susceptors 120A, 120B across the entire area of the susceptors.

The first portion 110A and the second portion 110B of the apparatus 110 also include the first susceptor 120A and the second susceptor 120B, respectively. The first susceptor 120A and the second susceptor 120B are coupled to the upper die 112A and the lower die 112B, respectively, in relatively close proximity to the electromagnetic coils 114A, 114B, respectively. Moreover, the first susceptor 120A and the second susceptor 120B have a first tool face 122A or surface and a second tool face 122B or surface, respectively, shaped according to a desired shape of a respective one of the first surface 132A and the second surface 132B of the multi-layered metallic part 131. For example, as shown in FIG. 3, the first tool face 122A and the second tool face 122B are non-planar (e.g., contoured) to define a non-planar shape of the first surface 132A and the second surface 132B of the multi-layered metallic part 131. In some embodiments, such as shown in FIG. 3, the shapes of the first tool face 122A and the second tool face are complementary. Although not shown, the upper die 112A and the lower die 112B may also include interface surfaces 113A, 113B that interface with the first susceptor 120A and the second susceptor 120B, respectively. The interface surfaces 113A, 113B may be shaped according to the desired shape of the corresponding first surface 132A and the second surface 132B of the multi-layered metallic part 131. The first tool face 122A and the second tool face 122B of the first susceptor 120A and the second susceptor 120B may be seated in the interface surfaces 113A, 113B of the upper die 112A and the lower die 112B, respectively.

The first susceptor 120A and the second susceptor 120B are made from an electrically and thermally conductive material that generates heat via electromagnetic induction in the presence of an oscillating magnetic field. In some embodiments, the first susceptor 120A and the second susceptor 120B are made from a ferrous material. More specifically, in certain implementations, the first susceptor 120A and the second susceptor 120B are made from a ferromagnetic material that generates increasing heat in the presence of an oscillating magnetic field until a predetermined threshold or Curie temperature of the susceptors is reached. Such susceptors can be defined as smart susceptors. As portions of a smart susceptor reach the Curie temperature, the magnetic permeability of those portions falls to unity (i.e., the susceptor becomes paramagnetic) at the Curie temperature. This drop in magnetic permeability has two effects. First, the drop in magnetic permeability limits the generation of heat by those portions at the Curie temperature. Second, the drop in magnetic permeability shifts the magnetic flux to the lower temperature portions, causing those portions below the Curie temperature to more quickly heat up to the Curie temperature. Accordingly, thermal uniformity of the first and second susceptors 120A, 120B can be achieved irrespective of the magnetic field applied to the susceptors by selecting the material from which the susceptors are made.

In accordance with one embodiment, each one of the first susceptor 120A and the second susceptor 120B is a layer or sheet of magnetically permeable material. Magnetically permeable materials for constructing the first susceptor 120A and the second susceptor 120B may include ferromagnetic materials that have an approximately 10-fold decrease in magnetic permeability when heated to a temperature higher than the Curie temperature. Such a large drop in permeability at the critical temperature promotes temperature control of the susceptor and, as a result, temperature control of the heat-treated material being manufactured as will be described in more detail below. Ferromagnetic materials may include iron, cobalt, nickel, gadolinium and dysprosium, and alloys thereof. The material composition of the ferromagnetic material of the first susceptor 120A and the second susceptor 120B is chosen to produce a set temperature point to which the first susceptor 120A and the second susceptor 120B are respectively heated in response to the magnetic field (e.g., electromagnetic energy) generated by the electromagnetic coils 114A, 114B. In this regard, the susceptors 120A, 120B may be constructed such that the Curie point of the susceptors, at which there is a transition between the ferromagnetic and paramagnetic phases of the material, defines the set temperature point to which the susceptors are inductively heated. Moreover, the first susceptor 120A and the second susceptor 120B may be constructed such that the Curie point is just above a phase transformation temperature of the material of at least one layer of the multi-layered metallic part 131. In some implementations, the susceptors can be replaced with conventional dies and the multi-layered metallic assembly 130 can be heated by other, non-susceptor, means, such as an autoclave, oven, external heaters, and the like.

Figure 6:
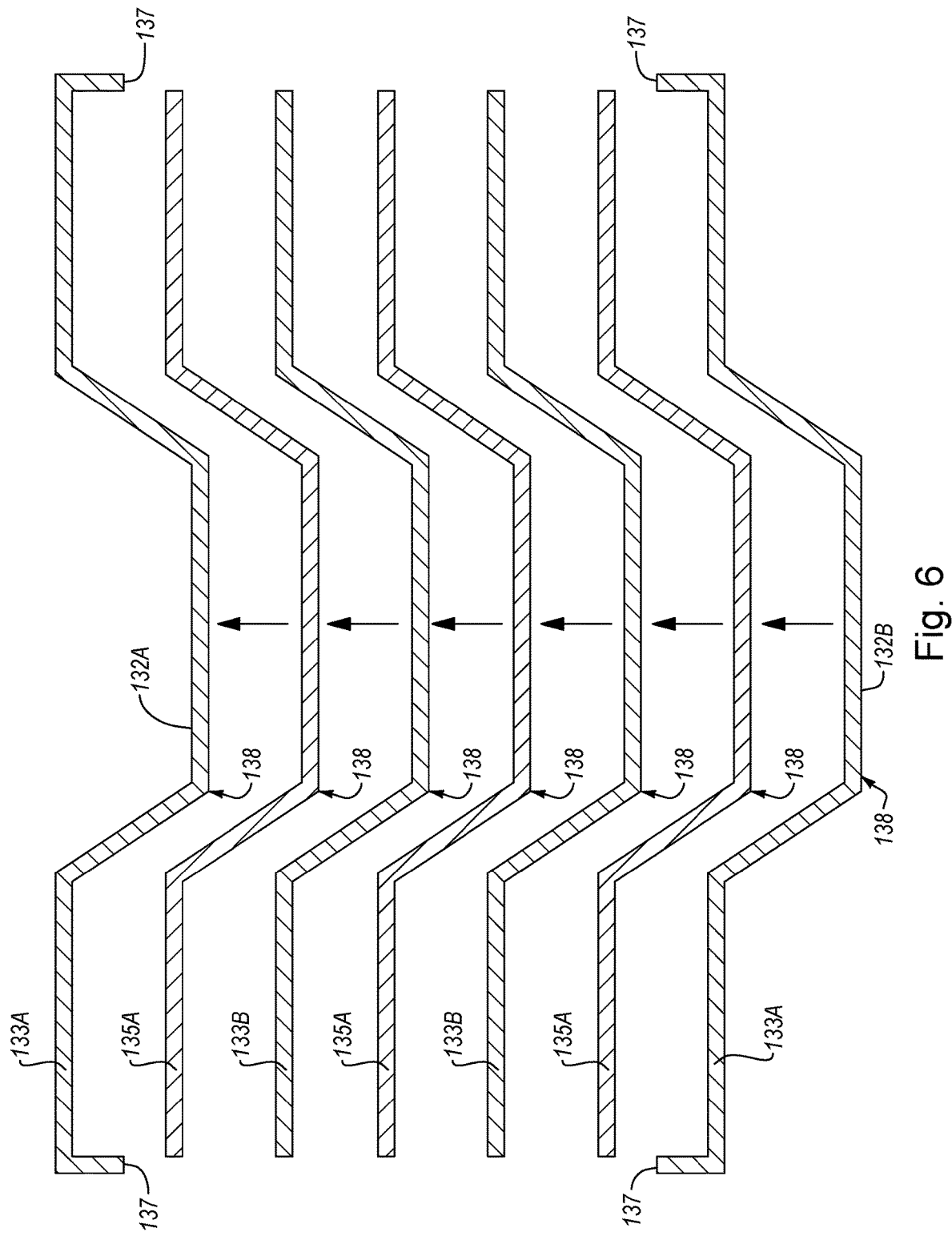
FIG. 6 is an exploded cross-sectional side elevation view of a multi-layered metallic assembly, according to one or more examples of the present disclosure.
Figure 7:
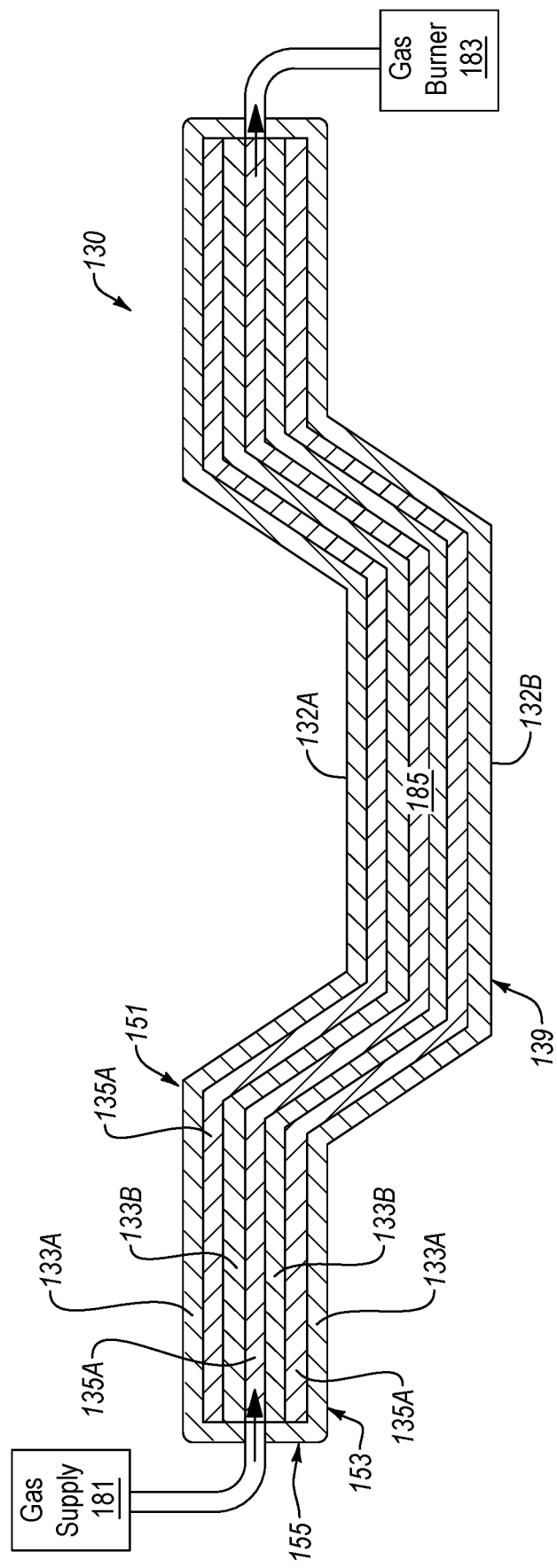
FIG. 7 is a cross-sectional side elevation view of a multi-layered metallic assembly, according to one or more examples of the present disclosure.

Referring to FIGS. 6 and 7, the multi-layered metallic assembly 130 includes a plurality of pre-formed layers arranged in a stacked formation (e.g., stacked together). The multi-layered metallic assembly 130 includes at least one high-strength powder layer and at least one ductile layer. According to one implementation, the multi-layered metallic assembly 130 includes at least one high-strength powder layer 135A sandwiched between a pair of outer ductile layers 133A. In other words, at least one high-strength powder layer 135A is interposed between two outer ductile layers 133A. The outer ductile layers 133A define the first surface 132A and the second surface 132B of the multi-layered metallic assembly 130. In some implementations, such as shown in FIGS. 6 and 7, the multi-layered metallic assembly 130 includes at least two high-strength powder layers 135A, two outer ductile layers 133A, and at least one inner ductile layer 133B. For example, in FIG. 7, the multi-layered metallic assembly 130 includes three high-strength powder layers 135A, two outer ductile layers 133A, and two inner ductile layers 133B. Each of the three high-strength powder layers 135A is sandwiched, or interposed, between two adjacent ductile layers (e.g., between an outer ductile layer 133A and an inner ductile layer 133B or between two inner ductile layers 133B). Accordingly, in certain implementations, the multi-layered metallic assembly 130 includes alternating ductile layers and high-strength powder layers.

The ductile layers of the multi-layered metallic assembly 130 are made of a material having a higher ductility than the material of the high-strength powder layers of the multi-layered metallic assembly 130. For example, in one implementation, each of the high-strength powder layers 135A is made of a steel and each of the outer ductile layers 133A and the inner ductile layers 133B is made of steel having a ductility greater than the steel of the high-strength powder layers 135A. Additionally, the high-strength powder layers 135A of the multi-layered metallic assembly 130 are made of a material that is stronger and harder than the material of the outer ductile layers 133A and the inner ductile layers 133B of the multi-layered metallic assembly 130. For example, in one implementation, each one of the outer ductile layers 133A and the inner ductile layers 133B is made of steel and each of the high-strength powder layers 135A is made of a steel having a higher yield strength and hardness than the steel of the ductile layers. According to one implementation, the high-strength powder layers 135A are i-s made of any of various high-strength or high-carbon steels, such as, but not limited to high-hardness armor steel and/or homogenous armor steel. For example, in some implementations, the high-strength powder layers 135A are made from a material having one or more (e.g., all) of the properties within the ranges listed in Table 1. In one implementation, the high-strength powder layers 135A are made from a material having one or more (e.g., all) of the properties of the example listed in Table 1. The properties listed in Table 1 include hardness, yield strength, ultimate tensile strength (UTS), and absorbed energy during a standard Charpy impact test (or, Charpy KV) (e.g., at −40° transversal to rolling direction).

TABLE 1

| | Hardness | Yield Strength | | UTS | | Elongation | Charpy KV | |
|---|---|---|---|---|---|---|---|---|
| | HB | MPa | ksi | MPa | ksi | 5 d(%) | J | ft · lbs |
| Range | 477-534 | ≥1100 | ≥160 | ≥1600 | ≥232 | ≥9 | ≥16 | ≥12 |
| Example | 495 | 1300 | 189 | 1700 | 247 | 12 | 28 | 21 |

In the context of protective armor for blocking explosive rounds, alternating ductile and high-strength metallic layers helps to fracture and capture the explosive rounds. For example, the high-strength metallic layers assist in fracturing the explosive round and the ductile metallic layers assist in capturing the fractured pieces of the explosive round.

According to one embodiment, each layer of the multi-layered metallic assembly 130 is separately pre-formed and subsequently stacked together to form the multi-layered metallic assembly 130. For example, in some implementations, the ductile layers 133A, 133B of the multi-layered metallic assembly 130 are pre-formed into a desired shape and to have desired crystallographic phase characteristics using various conventional metal forming techniques, such as rolling, extruding, die forming, forging, and the like. Because the ductile layers 133A, 133B are made of a relatively ductile metallic material, the ductile layers 133A, 133B can be fully consolidated when pre-formed using such metal forming techniques. However, because the high-strength powder layers 135A are made from a less ductile, high-strength metallic material, such conventional metal forming techniques are not capable of forming the high-strength powder layers 135A when fully consolidated. Accordingly, each high-strength powder layer 135A of the multi-layered metallic assembly 130 is partially consolidated when pre-formed. According to some implementations, the metallic material of each high-strength powder layer 135A of the multi-layered metallic assembly 130 is a powder or powdered metallic material (e.g., high-carbon steel powder, such as 0.80% carbon steel) partially consolidated together. In one implementation, each high-strength powder layer 135A of the multi-layered metallic assembly 130 is between 30% and 80% consolidated. The layers of the multi-layered metallic assembly 130 can have corresponding three-dimensional (3-D) sub-feature 138 in some implementations. When the layers are stacked together, the 3-D sub-features 138 collectively form a 3-D feature 139 of the multi-layered metallic assembly 130 and ultimately the multi-layered metallic part 131. The 3-D feature 139 is any of various features having a surface shape that is non-planar, such as, for example, a protrusion, bend, channel, bevel, indentation, and the like.

According to certain implementations, the high-strength powder layers 135A of the multi-layered metallic assembly 130 are self-supportive and formed separately from the ductile layers 133A, 133B. In other words, in such implementations, the high-strength powder layers 135A of the multi-layered metallic assembly 130 do not need the support of the ductile layers 133A, 133B to form a desired pre-form shape. Self-supportive high-strength powder layers 135A can be pre-formed into a desired shape using various metal forming techniques, such as cold compression, additive manufacturing, and the like. In some examples, each high-strength powder layer 135A of the multi-layered metallic assembly 130 includes a binder material (e.g., adhesive, glue, etc.) that helps maintain the shape of the powdered material before and during the stacking of the ductile layers and high-strength powder layers on top of each other to form the multi-layered metallic assembly 130. The binder material can be removed from the high-strength powder layers 135A, such as by heating and evaporating the binding material.

As shown in FIGS. 6 and 7, in some embodiments, the separately pre-formed ductile layers 133A, 133B and the high-strength powder layers 135A are stacked together in an alternating arrangement. The outer ductile layers 133A are joined together at respective ends 137 that extend around the entire periphery of sides 155 of the outer ductile layers 133A. The ends 127 can be joined together, such as via welding, to seal the ends 127 together and define an enclosed interior cavity 185 of the multi-layered metallic assembly 130 between the outer ductile layers 133A. In this manner, the inner ductile layers 133B and the high-strength powder layers 135A are sealingly enclosed within the interior volume 185. In some implementations, as shown, one or more gas supply lines and one or more excess gas lines can be situated between the ends 137 of the outer ductile layers 133A and open to the interior cavity 185. The ends 137 of the outer ductile layers 133A can be sealed against the gas supply line(s) and excess gas line(s) to maintain the sealed enclosure of the interior cavity 185. The gas supply line(s) can be coupled to a gas supply 181 that, during an oxide reduction process, supplies a gas (e.g., hydrogen, argon, etc.) to the gas supply line(s) for introducing the gas into the interior cavity 185. When the gas is flammable, such as hydrogen gas, the excess gas line(s) can be coupled to a gas burner 183 that, during the oxide reduction process, burns gas received from the interior cavity 185 via the excess gas line(s). In other implementations, instead of burning the gas, such as when the gas is a non-flammable gas (e.g., argon), the gas may be vented to atmosphere.

In some embodiments, the high-strength powder layers 135A of the multi-layered metallic assembly 130 are not self-supportive. Instead, in certain implementations, the powder of the high-strength powder layers 135A can be supported in a desired pre-form shape by the ductile layers 133A, 133B. For example, the ductile layers 133A, 133B can be arranged in a spaced apart manner, such as shown in FIG. 7, without the high-strength powder layers 135A so that open spaces are defined between the adjacent ductile layers 133A, 133B. The powdered material can then be poured, or otherwise delivered, into the open spaces between the ductile layers 133A, 133B to form the high-strength powder layers 135A. After the powdered material is delivered into the open spaces to form the high-strength powder layers 135A, the ends 137 of the outer ductile layers 133A can be sealed together to form an enclosure as described previously.

The shape of the multi-layered metallic assembly 130 corresponds with the shape of the multi-layered metallic part 131. For example, in some implementations, the multi-layered metallic assembly 130 has the same shape or the near net shape of the multi-layered metallic part 131. Accordingly, the multi-layered metallic assembly 130 undergoes only a nominal change or no change in shape when formed into the multi-layered metallic part 131 as described in more detail below. Because the multi-layered metallic assembly 130 has essentially the same shape as the desired shape of the multi-layered metallic part 131, the high-strength powder layers 135A of the multi-layered metallic assembly 130 can be consolidated without substantial reshaping of the multi-layered metallic assembly 130, such substantial reshaping of consolidated high-strength materials for armor being difficult to achieve. As shown, an interface (e.g., a distinct boundary) is defined between each high-strength powder layer 135A and an adjacent ductile layer 133A, 133B. Moreover, because substantial shaping of the individual layers of the multi-layered metallic assembly 130, having non-planar, contoured, or complex shapes, is relatively easy to achieve, a multi-layered metallic assembly 130, and thus a multi-layered metallic part 131, with non-planar, contoured, or complex shapes (see, e.g., the 3-D feature 139 of FIG. 8) and high-strength steel layers, can be formed.

Once formed, the multi-layered metallic assembly 130 is positioned between the first susceptor 120A and the second susceptor 120B of the apparatus 110 as shown in FIG. 1. As presented above, the first susceptor 120A and the second susceptor 120B may have shapes corresponding with the final shape of the multi-layered metallic part 131, and thus the multi-layered metallic assembly 130. Accordingly, positioning the multi-layered metallic assembly 130 between the first susceptor 120A and the second susceptor 120B may include complementary engaging the multi-layered metallic assembly 130 with one of the first susceptor 120A or the second susceptor 120B.

The power supply 150 of the system 100 is operably coupled to the electromagnetic coils 114A, 114B to supply electric power to the electromagnetic coils via power lines as shown. Operation of the power supply 150 can be switched between a first mode and a second mode. The power supply 150 may include a modulator that modulates an electric power signal to the electromagnetic coils 114A, 114B as commanded by the controller 140.

In the first mode, the power supply 150 supplies electric power with an oscillating or alternating current to the electromagnetic coils 114A, 114B for the purpose of heating the first susceptor 120A and the second susceptor 120B. The oscillating current results in oscillating magnetic fields generated by the electromagnetic coils 114A, 114B. The oscillating frequency of the magnetic field corresponds with the oscillating frequency of the oscillating current. The power supply 150 is operable to adjust the intensity (e.g., peak power/voltage) and/or frequency of the oscillating current according to a desired intensity (e.g., peak magnetic flux) of the oscillating magnetic fields generated by the electromagnetic coils 114A, 114B.

In the second mode, the power supply 150 supplies electric power with a non-oscillating or direct current (e.g., constant voltage) to the electromagnetic coils 114A, 114B for the purpose of changing the deformation properties (e.g., ductility and/or yield stress characteristics) of the multi-layered metallic assembly 130 prior to shaping the multi-layered metallic assembly 130 into the multi-layered metallic part 131. The non-oscillating current results in non-oscillating magnetic fields generated by the electromagnetic coils 114A, 114B. The power supply 150 is operable to adjust the intensity and pulse duration of the non-oscillating current according to a desired intensity and pulse duration of the magnetic fields generated by the electromagnetic coils 114A, 114B.

In the first and second modes, in some embodiments, the power supply 150 is operable to individually or separately control one or more electromagnetic coils 114A, 114B relative to one or more other electromagnetic coils. For example, in the first mode, the power supply 150 may supply oscillating current of a first intensity and first frequency to one or more of the electromagnetic coils 114A, 114B, while concurrently or non-concurrently supplying oscillating current of a second intensity and/or second frequency to one or more other electromagnetic coils for the purposes of heating some portions of the first susceptor 120A and the second susceptor 120B differently than others. The second intensity and second frequency are different than the first intensity and first frequency. Similarly, in the second mode, the power supply 150 may supply non-oscillating current of a first intensity and first pulse duration to one or more of the electromagnetic coils 114A, 114B, while concurrently or non-concurrently supplying non-oscillating current of a second intensity and/or second pulse duration to one or more other electromagnetic coils to change the ductility and/or yield stress characteristics of some portions of the multi-layered metallic assembly 130 differently than other portions. The second pulse duration is different than the first pulse duration.

Individually controlling one or more of the electromagnetic coils 114A, 114B differently than other electromagnetic coils may result in a more efficient use of power and lower cost to form the multi-layered metallic assembly 130. Generally, in some embodiments, oscillating magnetic fields of a higher intensity or frequency may be desirable to heat portions of the first susceptor 120A and the second susceptor 120B corresponding with portions of the multi-layered metallic assembly 130 that have shaped features, such as bends, recesses, ridges, and the like, compared to portions of the material without such features. Similarly, non-oscillating magnetic fields of a higher intensity or duration may be desirable to impart a higher change in the ductility and/or yield stress characteristics of the multi-layered metallic assembly 130 for portions of the material having shaped features compared to portions of the material without such features. Accordingly, the power supply 150 may supply current at a higher intensity, frequency, and/or pulse duration to electromagnetic coils 114A, 114B in the proximity of shaped features of the multi-layered metallic assembly 130 and/or portions of the first susceptor 120A and the second susceptor 120B corresponding with such shaped features.

The controller 140 of the system 100 controls operation of the power supply 150, as well as the hydraulic actuator 160. The controller 140 is depicted in FIG. 1 as a single physical unit, but can include two or more physically separated units or components in some embodiments if desired. In certain embodiments, the controller 140 receives multiple inputs, processes the inputs, and transmits multiple outputs. The multiple inputs may include various user inputs. The inputs are processed by the controller 140 using various algorithms, stored data, and other inputs to update the stored data and/or generate output values. The generated output values and/or commands are transmitted to other components of the controller and/or to one or more elements of the system 10, such as the power supply 150 and hydraulic actuator 160, to control the system to achieve desired results, and more specifically, achieve a desired formation or shaping of the multi-layered metallic assembly 130.

The controller 140 may be implemented as a hardware circuit comprising custom VLSI circuits or gate arrays, off-the-shelf semiconductors such as logic chips, transistors, or other discrete components. Further, the controller 140 may also be implemented in programmable hardware devices such as field programmable gate arrays, programmable array logic, programmable logic devices or the like. The controller 140 may also be implemented in software for execution by various types of processors. The controller 140 may, for instance, include one or more physical or logical blocks of computer instructions, which may, for instance, be organized as an object, procedure, or function. Nevertheless, the executables of the controller 140 need not be physically located together, but may comprise disparate instructions stored in different locations which, when joined logically together, comprise the module and achieve the stated purpose for the module.

The outputs of the controller 140 to the power supply 150 include commands to supply electric power to the electromagnetic coils 114A, 114B according to one of the two modes. More specifically, in the first mode, the controller 140 commands the power supply 150 to supply oscillating power at a commanded peak intensity (e.g., voltage) and frequency to the electromagnetic coils 114A, 114B for a specified time. In the second mode, the controller 140 commands the power supply 150 to supply non-oscillating power at a commanded intensity and pulse duration to the electromagnetic coils 114A, 114B for a specified number of pulses. Additionally, according to some embodiments, the controller 140 commands the power supply 150 to concurrently supply electric power with first characteristics to some of the electromagnetic coils 114A, 114B and electric power with second characteristics different than the first characteristics others of the electromagnetic coils 114A, 114B.

The outputs of the controller 140 to the hydraulic actuator 160 include commands to move the first portion 110A and the second portion 110B of the apparatus 110 together and apart. The first portion 110A and the second portion 110B are moved together to apply pressure to or compress the multi-layered metallic assembly 130, and moved apart to remove the pressure from the multi-layered metallic assembly 130, such as after the multi-layered metallic part 131 is formed.

Referring to FIG. 3, the system 100 may also include a first cooling system 180 and a second cooling system 190. The first cooling system 180 is operable to cool the electromagnetic coils 114A, 114B. Electric current passing through the electromagnetic coils 114A, 114B heats the coils. Due to the relatively high intensity of the current, the temperatures of the electromagnetic coils 114A, 114B can reach extreme temperatures unsuitable for operation. The first cooling system 180 is fluidly coupled to the electromagnetic coils 114A, 114B to maintain the temperature of the electromagnetic coils within a temperature range suitable for operation. In one implementation, as shown, the first cooling system 180 includes fluid lines in heat transferring communication with the electromagnetic coils 114A, 114B. The first cooling system 180 urges a fluid, such as coolant, through the fluid lines to transfer heat away from the electromagnetic coils 114A, 114B. In other implementations, the first cooling system 180 can be any of various other cooling systems for regulating the temperature of the electromagnetic coils 114A, 114B.

The second cooling system 190 is operable to regulate (e.g., reduce) the temperature of the first susceptor 120A and the second susceptor 120B. The second cooling system 190 may be the same as, or separate from, the first cooling system 180. In one implementation, the second cooling system 190 includes fluid lines in heat transferring communication with the first susceptor 120A and the second susceptor 120B. The second cooling system 190 urges a fluid, such as coolant, through the fluid lines to transfer heat away from the first susceptor 120A and the second susceptor 120B. In other implementations, the second cooling system 190 can be any of various other cooling systems for regulating the temperature of the first susceptor 120A and the second susceptor 120B. According to certain implementations, cooling of the first susceptor 120A and the second susceptor 120B by the second cooling system 190 also functions to cool other components of the apparatus 110, such as the upper and lower dies 112A, 112B, as well as the multi-layered metallic part 131 via heat transfer from the other components to the first susceptor 120A and the second susceptor 120B.

Figure 4:
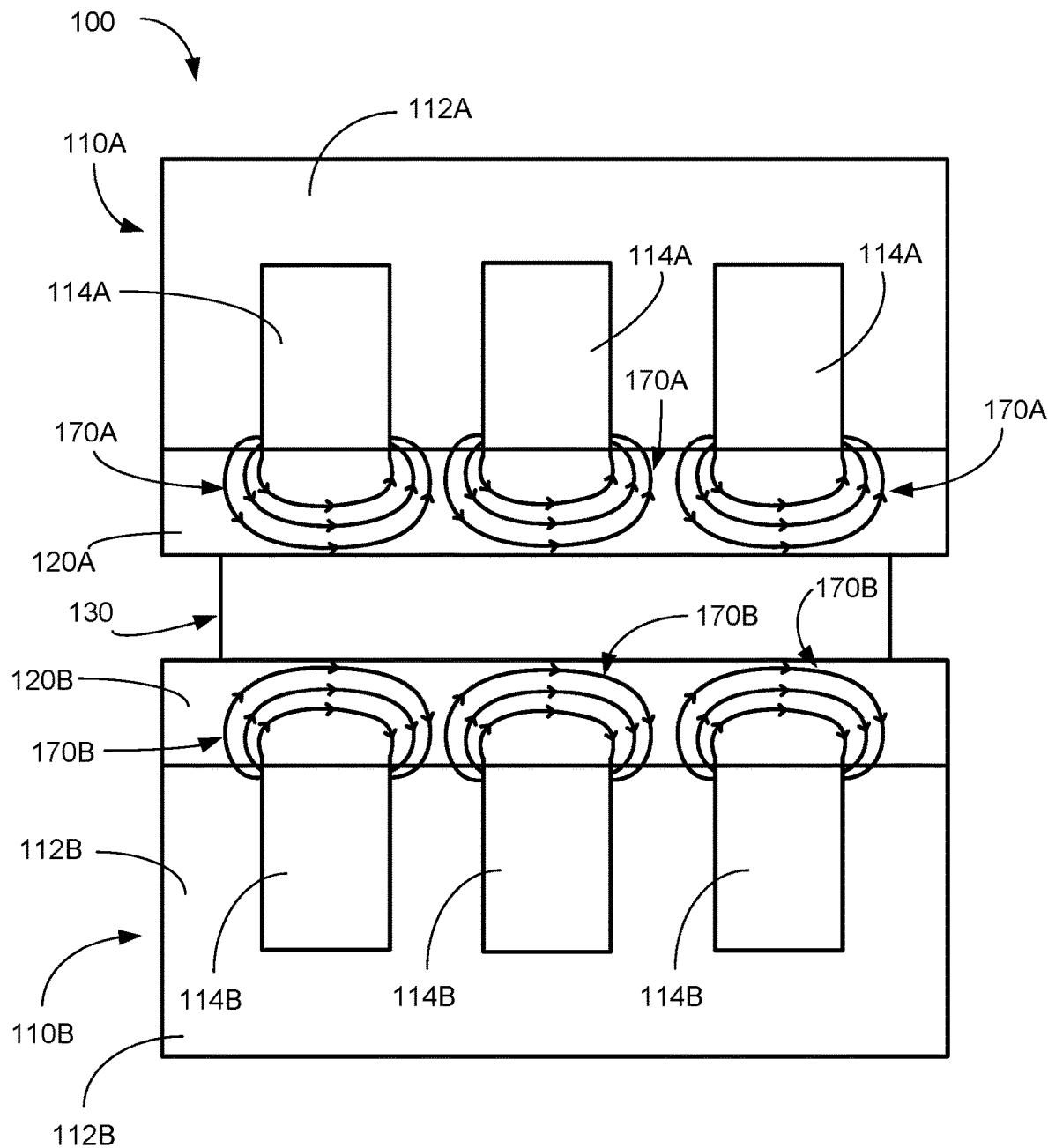
FIG. 4 is a schematic side view of an apparatus for forming a multi-layered metallic assembly into a multi-layered metallic part, according to one or more examples of the present disclosure.
Figure 5:
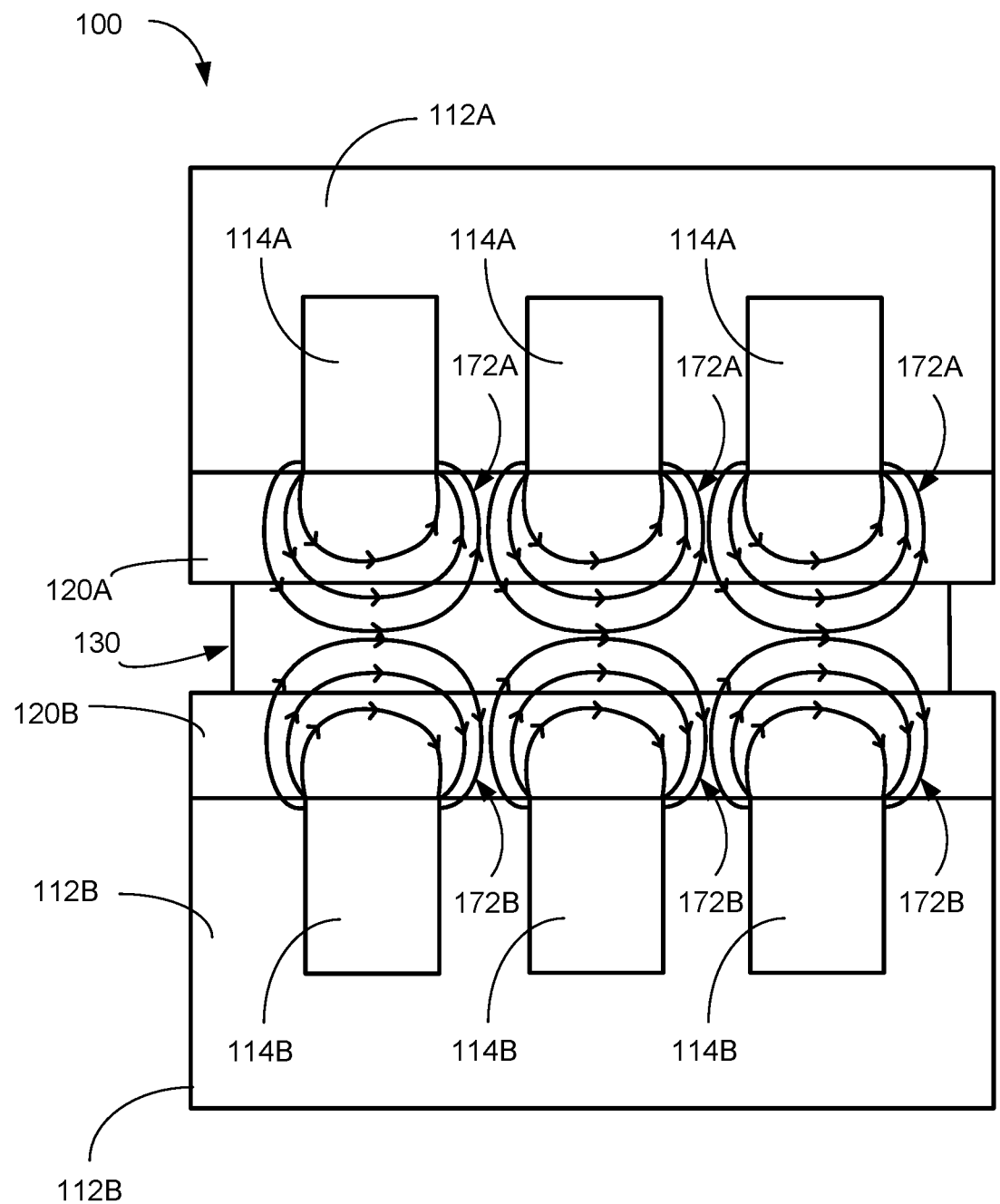
FIG. 5 is a schematic side view of the apparatus of FIG. 4, according to one or more examples of the present disclosure.
Figure 13:
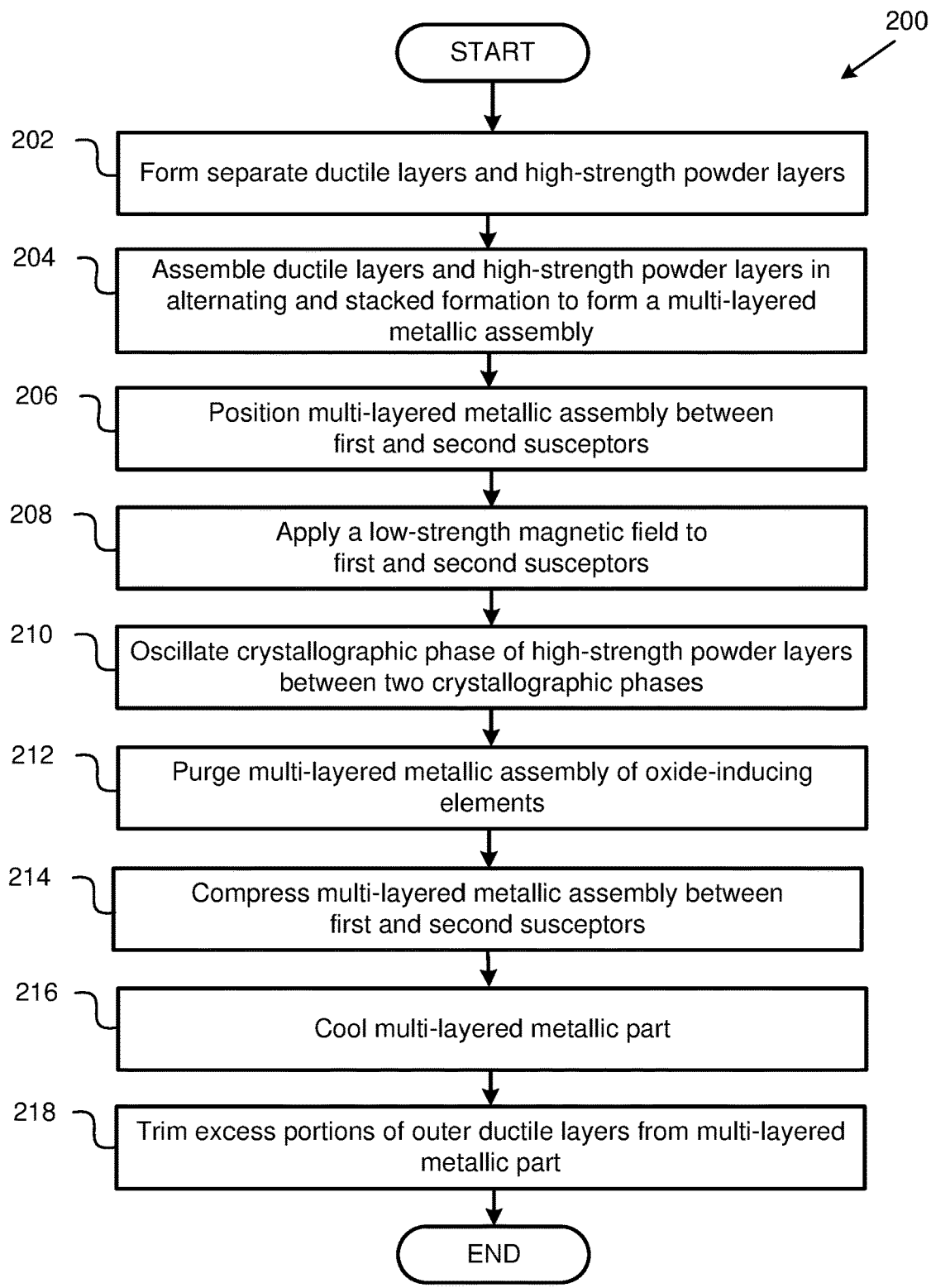
FIG. 13 is a schematic flow diagram of a method of forming a multi-layered metallic part, according to one or more examples of the present disclosure.

Referring to FIGS. 4, 5, and 13, a method 200 of forming a multi-layered metallic part 131 from a multi-layered metallic assembly 130, according to one embodiment, is shown. The method 200 begins by forming separate ductile layers 133A, 133B and at least one high-strength powder layer 135A at 202. The method 200 further includes assembling the ductile layers 133A, 133B and the at least one high-strength powder layer 135A in an alternating and a stacked formation to form a multi-layered metallic assembly 130 at 204. The method 200 also includes positioning the multi-layered metallic assembly 130 between a first susceptor 120A and a second susceptor 120B of an apparatus 110 at 206. Positioning the multi-layered metallic assembly 130 between the first susceptor 120A and the second susceptor 120B at 204 may include setting the multi-layered metallic assembly 130 onto, and in complementary engagement with, the second susceptor 120B with the first susceptor 120A spaced apart from the multi-layered metallic assembly 130.

With the multi-layered metallic assembly 130 between the first susceptor 120A and the second susceptor 120B, or, in some implementations, prior to positioning the multi-layered metallic assembly 130 between the first susceptor 120A and the second susceptor 120B, the method 200 includes applying a low-strength magnetic field to the first susceptor 120A and the second susceptor 120B at 208. Referring to FIG. 4, according to one embodiment, each of the electromagnetic coils 114A, 114B generates a respective one of low-strength magnetic fields 170A, 170B. The low-strength magnetic fields 170A, 170B transmit from the electromagnetic coils 114A, 114B into the first susceptor 120A and the second susceptor 120B, respectively. As mentioned above, the low-strength magnetic fields 170A, 170B are generated by the electromagnetic coils 114A, 114B as a low-strength oscillating current with a desired peak intensity and frequency is applied to each of the electromagnetic coils for a desired duration. The low-strength magnetic field applied to the first susceptor 120A and the second susceptor 120B at step 206 of the method 200 can be defined as a single magnetic field generated by one electromagnetic coil, or a collective magnetic field comprised of the combination of magnetic fields generated by multiple electromagnetic coils.

The low-strength magnetic fields 170A, 170B are oscillating magnetic fields with a relatively low peak magnetic flux in some implementations. The peak magnetic flux of the low-strength magnetic field can be below about 0.05 tesla in certain implementations, and below about 1 tesla in one implementation. Further, in some implementations, the oscillating frequency of the low-strength magnetic fields 170A, 170B can be between about 60 Hz and about 10,000 Hz. The application of the low-strength magnetic field to the first susceptor 120A and the second susceptor 120B heats the susceptors. Preferably, the peak magnetic flux of each of the low-strength magnetic fields 170A, 170B is high enough that the first susceptor 120A and the second susceptor 120B heat up to the Curie temperature of the susceptors.

Figure 9:
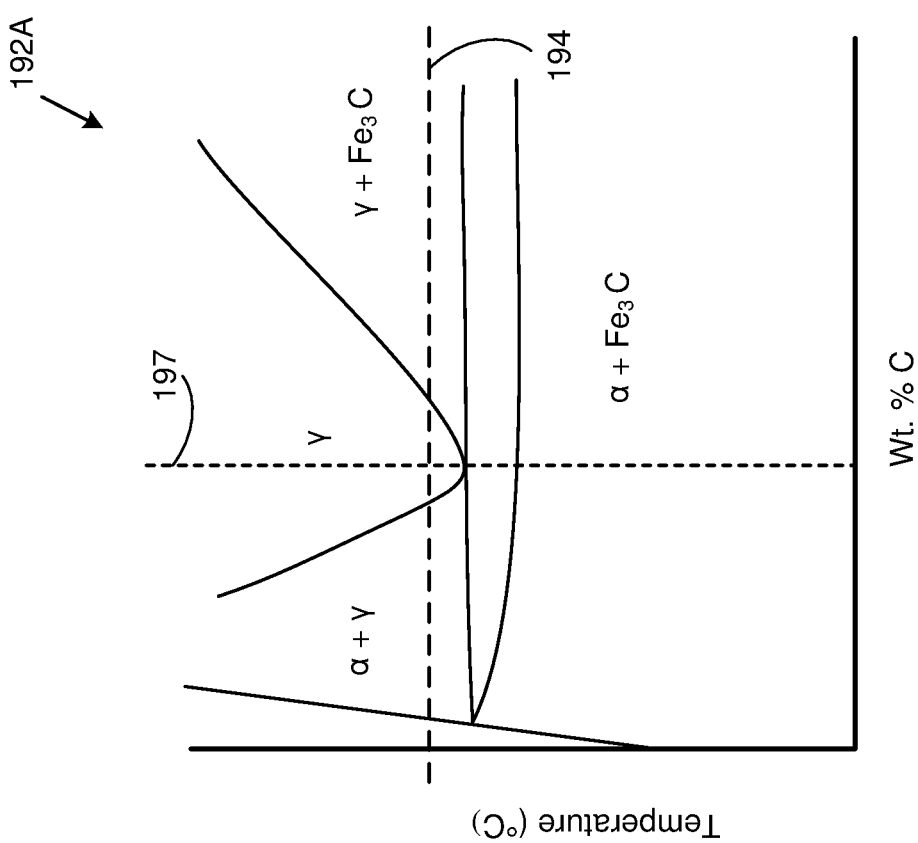
FIG. 9 is a phase diagram of a powdered material of a high-strength powder layer of a multi-layered metallic assembly, according to one or more examples of the present disclosure.

After heating the first susceptor 120A and the second susceptor 120B, and with the multi-layered metallic assembly 130 between the first susceptor 120A and the second susceptor 120B, heat from the susceptors is transferred to the multi-layered metallic assembly 130 to increase the processing temperature of the multi-layered metallic assembly 130 up to a first desired temperature 194 (see, e.g., the phase diagram 192A of FIG. 9). Heating the multi-layered metallic assembly 130 may include moving the first susceptor 120A and the second susceptor 120B toward each other to bring the multi-layered metallic assembly 130 into close proximity or in contact with, but without applying substantial compressive forces to, both the first susceptor 120A and the second susceptor 120B. Heat may be transferred from the first susceptor 120A and the second susceptor 120B to the multi-layered metallic assembly 130 through any of various heat transfer mechanisms, such as conduction and radiation.

The first desired temperature 194 is selected such that for a given percentage of carbon (indicated in the diagrams of FIGS. 9-12 by carbon-percentage line 197) in the high-strength powder layers 135A of the multi-layered metallic assembly 130 the first desired temperature 194 is just above a temperature necessary to effectuate a crystallographic phase change in the high-strength powder layers 135A. The first desired temperature 194 can be the same as, or different than, the Curie temperature of the first susceptor 120A and the second susceptor 120B. For example, the high-strength powder layers 135A include a high-strength steel, such as is used for armor plates for vehicles. In one implementation, the temperature necessary to effectuate a crystallographic phase change in the high-strength powder layers 135A is between 1400° F. and 1450° F., such as 1414° F. or 1430° F. Referring to FIG. 9, in some embodiments, the first desired temperature 194 is associated with the high-strength powder layers 135A changing their crystallographic phase from a ferrite ($\alpha$) and cementite ($Fe_3C$) crystallographic phase to an austenite ($\gamma$) crystallographic phase. In other words, with the temperature of the high-strength powder layers 135A at the first desired temperature 194, the phase distribution and resulting hardness of the powdered material of the high-strength powder layers 135A changes.

The method 200 additionally includes oscillating the crystallographic phase of the high-strength powder layers 135A between at least two crystallographic phases at 210 to consolidate the powdered material of the high-strength powder layers 135A. According to a first mode of phase oscillation shown in FIGS. 9 and 10, with the temperature of the high-strength powder layers 135A of the multi-layered metallic assembly 130 raised to and held constant at, via application of a low-strength magnetic field to the first susceptor 120A and the second susceptor 120B at 208, the method 200 includes alternately or intermittently applying a high-strength magnetic field to and removing the high-strength magnetic field from the multi-layered metallic assembly 130. The method 200 may oscillate the crystallographic phase of the high-strength powder layers 135A between at least two crystallographic phases at least twice in some implementations, more than 10 times in other implementations, and more than 100 times in yet further implementations.

Referring to FIG. 5, according to one embodiment, each of the electromagnetic coils 114A, 114B generates a high-strength magnetic field 172A, 172B, respectively. The high-strength magnetic fields 172A, 172B transmit from the electromagnetic coils 114A, 114B, through the first susceptor 120A and the second susceptor 120B, respectively, and into the multi-layered metallic assembly 130. As mentioned above, the high-strength magnetic fields 172A, 172B are generated by the electromagnetic coils 114A, 114B as a high-strength non-oscillating current with a desired intensity, pulse duration, and pulse quantity is applied to each of the electromagnetic coils. The high-strength magnetic fields 172A, 172B are generated from the same electromagnetic coils 114A, 114B that generated the low-strength magnetic fields 170A, 170B. In operation, switching between generation of a low-strength magnetic field and high-strength magnetic field includes switching between supplying a low-strength oscillating current and a high-strength non-oscillating current, respectively, to the electromagnetic coils 114A, 114B. Like the low-strength magnetic field, the high-strength magnetic field applied to the multi-layered metallic assembly 130 can be defined as a single magnetic field generated by one electromagnetic coil, or a collective magnetic field comprised of the combination of magnetic fields generated by multiple electromagnetic coils.

The high-strength magnetic fields 172A, 172B are non-oscillating magnetic fields with a relatively high magnetic flux in some implementations. The magnetic flux of the high-strength magnetic field can be above about 0.2 tesla in certain implementations, and above about 5 tesla in one implementation, such as at least 30 tesla. Further, in some implementations, the pulse duration of each pulse of high-strength magnetic field can be between about 2 seconds and about 30 seconds, and pulse delay between pulses of a given set of pulses can be between about 2 seconds and about 30 seconds. The pulse quantity, or the number of pulses of high-strength non-oscillating magnetic fields applied to the multi-layered metallic assembly 130 in a given set of pulses, can be between 5 pulses and about 500 pulses.

Figure 10:
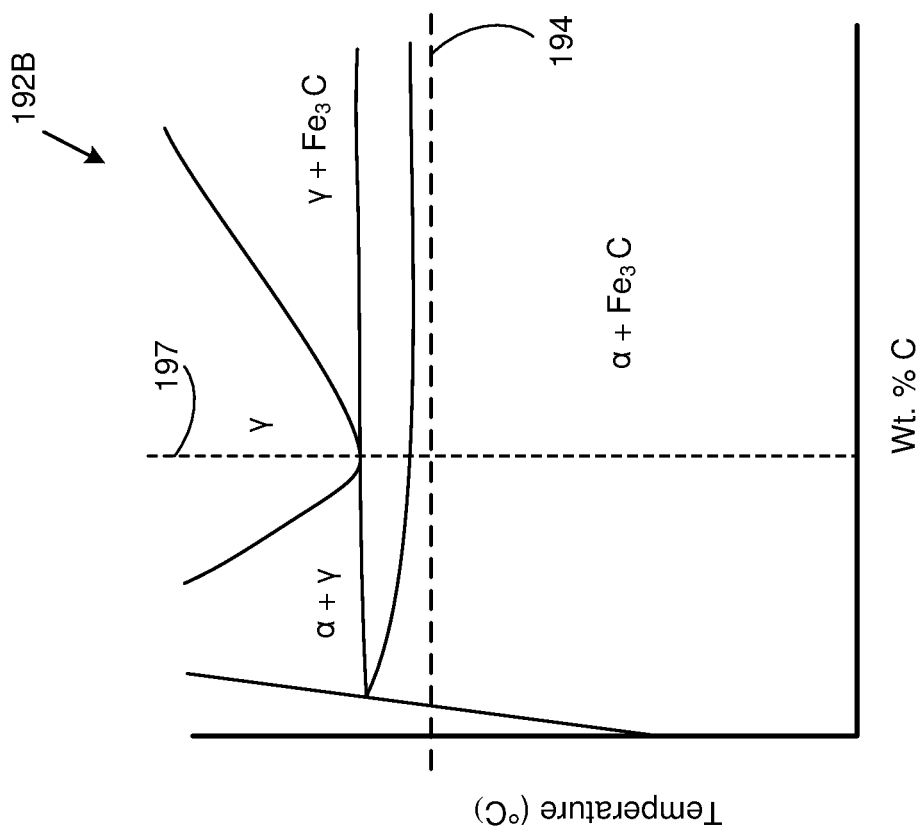
FIG. 10 is a phase diagram of a powdered material of a high-strength powder layer of a multi-layered metallic assembly, according to one or more examples of the present disclosure.

As shown in the phase diagram 192B of FIG. 10, while holding constant the first desired temperature 194, the application of the high-strength magnetic fields 172A, 172B to the multi-layered metallic assembly 130 changes the crystallographic phase of the high-strength powder layers 135A (e.g., from the austenite ($\gamma$) crystallographic phase to the ferrite ($\alpha$) and cementite ($Fe_3C$) crystallographic phase). In other words, the high-strength magnetic fields 172A, 172B, in effect, upwardly shift the temperature-to-phase relationship of the high-strength powder layers 135A, such that the temperature at which crystallographic phase transformation occurs (i.e., phase transformation temperature) is higher than the first desired temperature 194. In one implementation, the temperature-to-phase relationship is upwardly shifted such that the phase transformation temperature is about 1470° F.

According to the first mode of oscillation of the crystallographic phase of the high-strength powder layers 135A, the high-strength magnetic fields 172A, 172B are removed from the high-strength powder layers 135A, which downwardly shifts the temperature-to-phase relationship (see, e.g., FIG. 9) back to the original temperature-to-phase relationship. With the first desired temperature 194 of the high-strength magnetic fields 172A, 172B held constant, the downward shift of the temperature-to-phase relationship changes the crystallographic phase of the high-strength powder layers 135A back to its crystallographic phase prior to application of the high-strength magnetic fields 172A, 172B (e.g., from the ferrite ($\alpha$) and cementite ($Fe_3C$) crystallographic phase back to the austenite ($\gamma$) crystallographic phase). Removing the high-strength magnetic fields 172A, 172B from the high-strength powder layers 135A includes terminating the supply of or reducing the intensity of the electrical power to the electromagnetic coils 114A, 114B.

Oscillation of the crystallographic phase includes repeating the cycle of applying the high-strength magnetic fields 172A, 172B, to change a crystallographic phase of the high-strength powder layers 135A from a first crystallographic phase to a second crystallographic phase, and removing the high-strength magnetic fields 172A, 172B, to change a crystallographic phase of the high-strength powder layers 135A from the second crystallographic phase back to the first crystallographic phase. In certain implementations, oscillation of the crystallographic phase of the high-strength powder layers 135A in the first oscillation mode concludes with the high-strength powder layers 135A in the austenite ($\gamma$) crystallographic phase (e.g., solely in the austenite crystallographic phase).

Due to the cost and thermal constraints associated with the application of high-strength current to the electromagnetic coils 114A, 114B to generate a high-strength non-oscillating magnetic field, the high-strength non-oscillating magnetic field may be applied in multiple limited-duration pulses. In some embodiments, each pulse of a high-strength non-oscillating magnetic field is followed by a compression (see step 210 of method 200 below) and release of the multi-layered metallic assembly 130.

Figure 12:
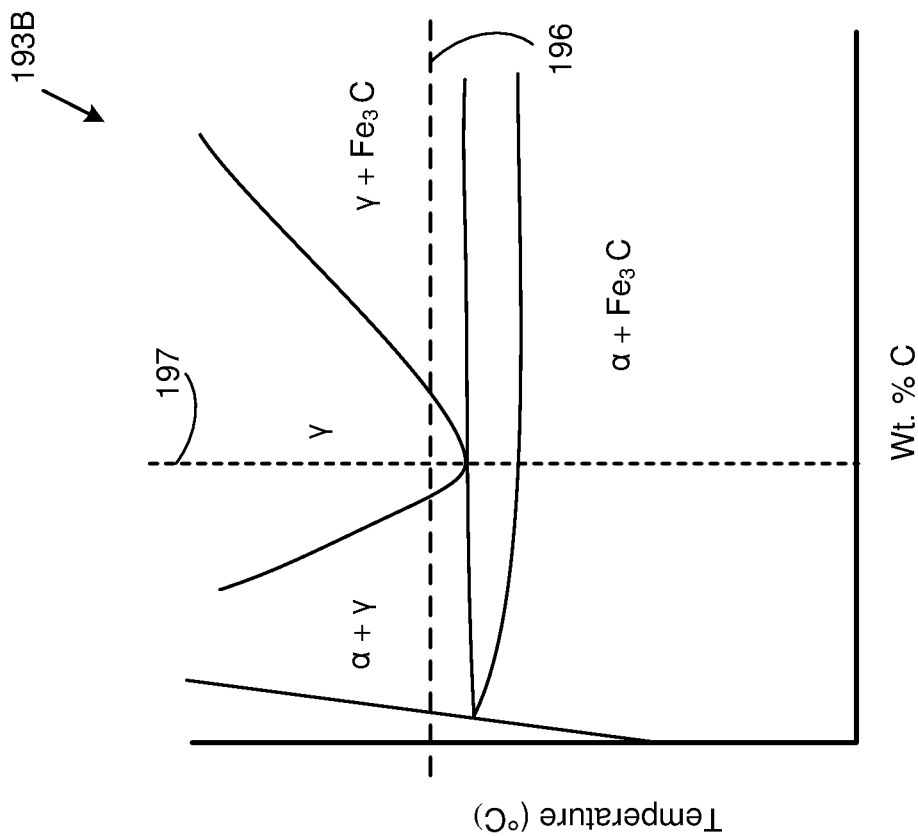
FIG. 12 is a phase diagram of a powdered material of a high-strength powder layer of a multi-layered metallic assembly, according to one or more examples of the present disclosure.
Figure 11:
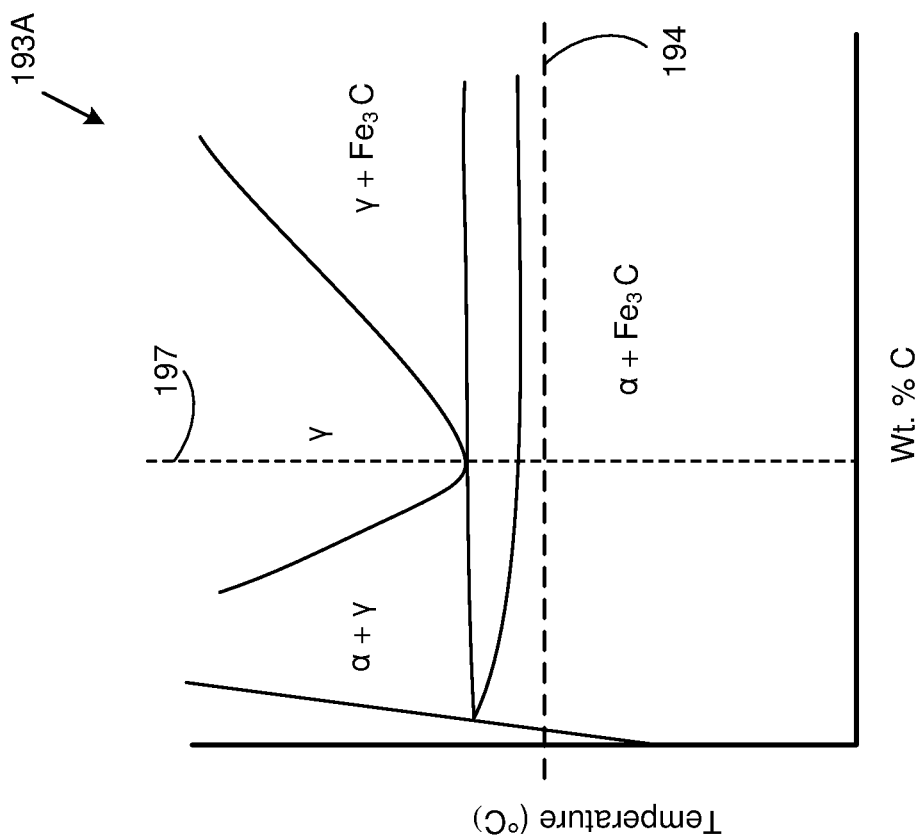
FIG. 11 is a phase diagram of a powdered material of a high-strength powder layer of a multi-layered metallic assembly, according to one or more examples of the present disclosure.

According to a second mode of oscillation shown in the phase diagrams 193A, 193B of FIGS. 11 and 12, respectively, instead of oscillating between crystallographic phases by holding constant the temperature of the high-strength powder layers 135A of the multi-layered metallic assembly 130 and changing the temperature-to-phase relationship of the high-strength powder layers 135A by applying the high-strength magnetic fields 172A, 172, as with the first mode of oscillation, oscillating between crystallographic phases is accomplished by holding constant the temperature-to-phase relationship and changing the temperature of the high-strength powder layers 135A. In other words, in the second mode of oscillation, the high-strength magnetic fields 172A, 172B are not repeatedly applied to and released from the high-strength powder layers 135A. Rather, in the second mode of oscillation, the temperature of the high-strength powder layers 135A is repeatedly adjusted between a first desired temperature 194 and a second desired temperature 196.

The first desired temperature 194 corresponds with a first crystallographic phase (e.g., a ferrite ($\alpha$) and cementite ($Fe_3C$) crystallographic phase) of the high-strength powder layers 135A (see, e.g., FIG. 11) and the second desired temperature 196 corresponds with a second crystallographic phase (e.g., an austenite ($\gamma$) crystallographic phase) of the high-strength powder layers 135A (see, e.g., FIG. 12). Accordingly, as the temperature of the high-strength powder layers 135A oscillates between the first desired temperature 194 and the second desired temperature 196, the crystallographic phase of the high-strength powder layers 135A correspondingly oscillates between crystallographic phases. In certain implementations, oscillation of the crystallographic phase of the high-strength powder layers 135A in the second mode concludes with the high-strength powder layers 135A in the austenite ($\gamma$) crystallographic phase (i.e., the temperature of the high-strength powder layers 135A being at the second desired temperature 196.

Oscillating between crystallographic phases, whether in the first oscillation mode or the second oscillation mode, helps to consolidate the powdered material of the high-strength powder layers 135A of the multi-layered metallic assembly 130. More specifically, oscillation between crystallographic phases promotes superplasticity of the high-strength powder layers 135A, which helps to effectuate (e.g., accelerate) the consolidation of the high-strength powder layers 135A. Superplasticity of the high-strength powder layers 135A develops due to the oscillation of the volume of the high-strength powder layers 135A that occurs as the high-strength powder layers 135A oscillate between crystallographic phases.

Figure 8:
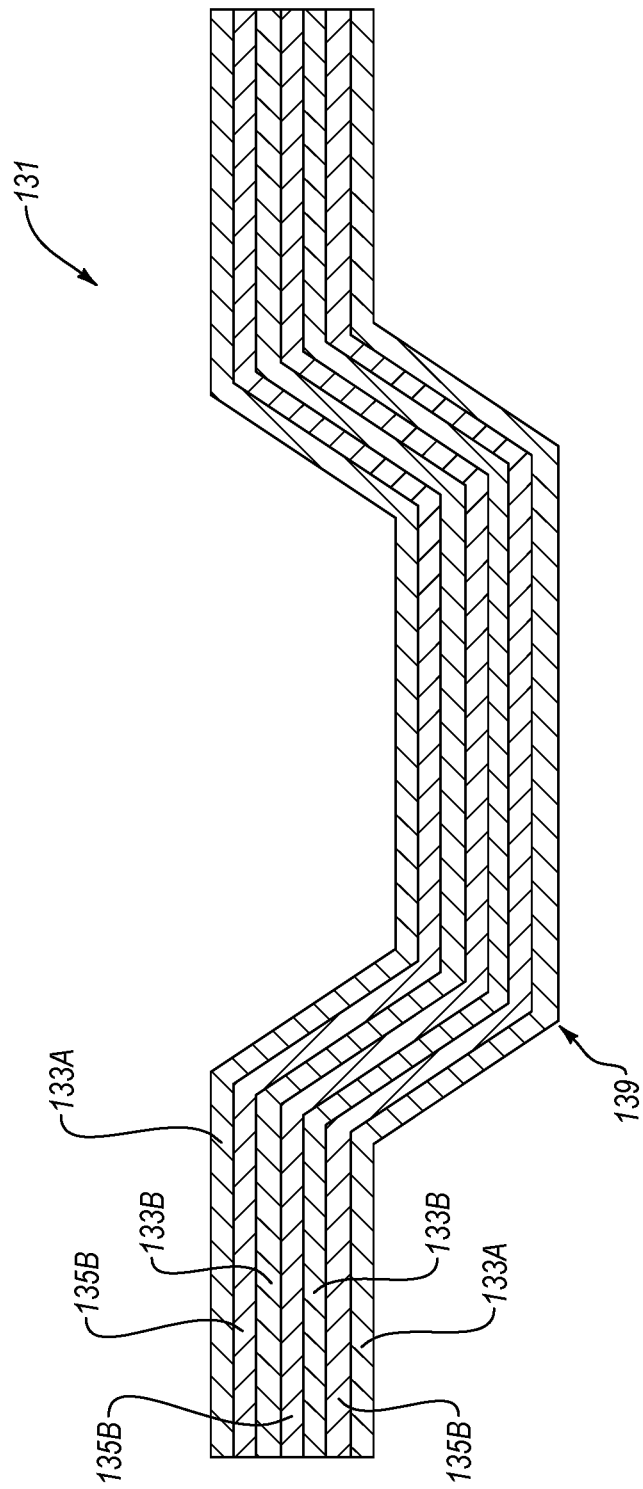
FIG. 8 is a cross-sectional side elevation view of a multi-layered metallic part, according to one or more examples of the present disclosure.

The method 200 produces a multi-layered metallic part 131 that includes alternating ductile layers 133A, 133B and high-strength consolidated layers 135B (see, e.g., FIG. 8). The high-strength consolidated layers 135B are formed by consolidating the high-strength powder layers 135A. In other words, consolidating the high-strength powder layers 135A converts the high-strength powder layers 135A, in a partially consolidated state, of the multi-layered metallic assembly 130 into the high-strength consolidated layers 135B, in a fully consolidated state, of the multi-layered metallic part 131. In some implementations, such as when the multi-layered metallic part 131 is used for armor, performance of the armor is improved when the layers of the multi-layered part 131 are distinctly demarcated. In other words, the more demarcated or distinctly separated the layers of the multi-layered metallic part 131, the more effective the part is at stopping and fragmenting projectiles that impact the part. In contrast, the more the layers are diffused together or the less demarcated the layers, the lower the effectiveness of the multi-layered metallic part 131 at stopping and fragmenting projectiles. Oscillation of the crystallographic phases of the high-strength powder layers 135A provided by the method 200 to effectuate consolidation of the high-strength powder layers 135A into high-strength consolidated layers 135B promotes demarcation of the layers of the part. Put another way, consolidating the high-strength powder layers 135A via oscillation of the crystallographic phases of the high-strength powder layers 135A reduces diffusion between adjacent layers of the multi-layered metallic part 131.

Generally, the more accelerated the consolidation of the high-strength powder layers 135A, the better the demarcation between layers of the multi-layered metallic part 131. In certain implementations, the first mode of oscillation consolidates the high-strength powder layers 135A faster than the second mode of oscillation. For example, changes to the temperature-to-phase relationship of the high-strength powder layers 135A tend to occur faster than changes to the temperature of the high-strength powder layers 135A.

While the crystallographic phase of the high-strength powder layers 135A is oscillated at 210, in some implementations, the method 200 includes purging the multi-layered metallic assembly 130 of oxide-inducing element at 212. Referring to FIG. 7, in certain implementations, purging the multi-layered metallic assembly 130 at 212 includes introducing gas from the gas supply 181 into the interior cavity 185 of the multi-layered metallic assembly 130. The gas chemically reacts with oxygen in the interior cavity 185 to reduce metal oxides and help prevent oxidation within the multi-layered metallic assembly 130. Excess gas not used in the oxide reduction process exits the interior cavity 185 and is burned by the gas burner 183 or vented to atmosphere. Prior to purging at 212, the outer ductile layers 133A are sealed together as described above.

During or after oscillating the crystallographic phase of the high-strength powder layers 135A and purging the multi-layered metallic assembly 130, the method 200 includes compressing the multi-layered metallic assembly 130 between the first susceptor 120A and the second susceptor 120B at 214. Compression of the multi-layered metallic assembly 130 between the first susceptor 120A and the second susceptor 120B slightly deforms the shape of the multi-layered metallic assembly 130 into a final shape defined by the tool faces 122A, 122B of the susceptors. Additionally, compression of the multi-layered metallic assembly 130 helps to bond the layers of the assembly together. Compression of the multi-layered metallic assembly 130 at 210 transitions the multi-layered metallic assembly 130 into the multi-layered metallic part 131.

Figure 14:
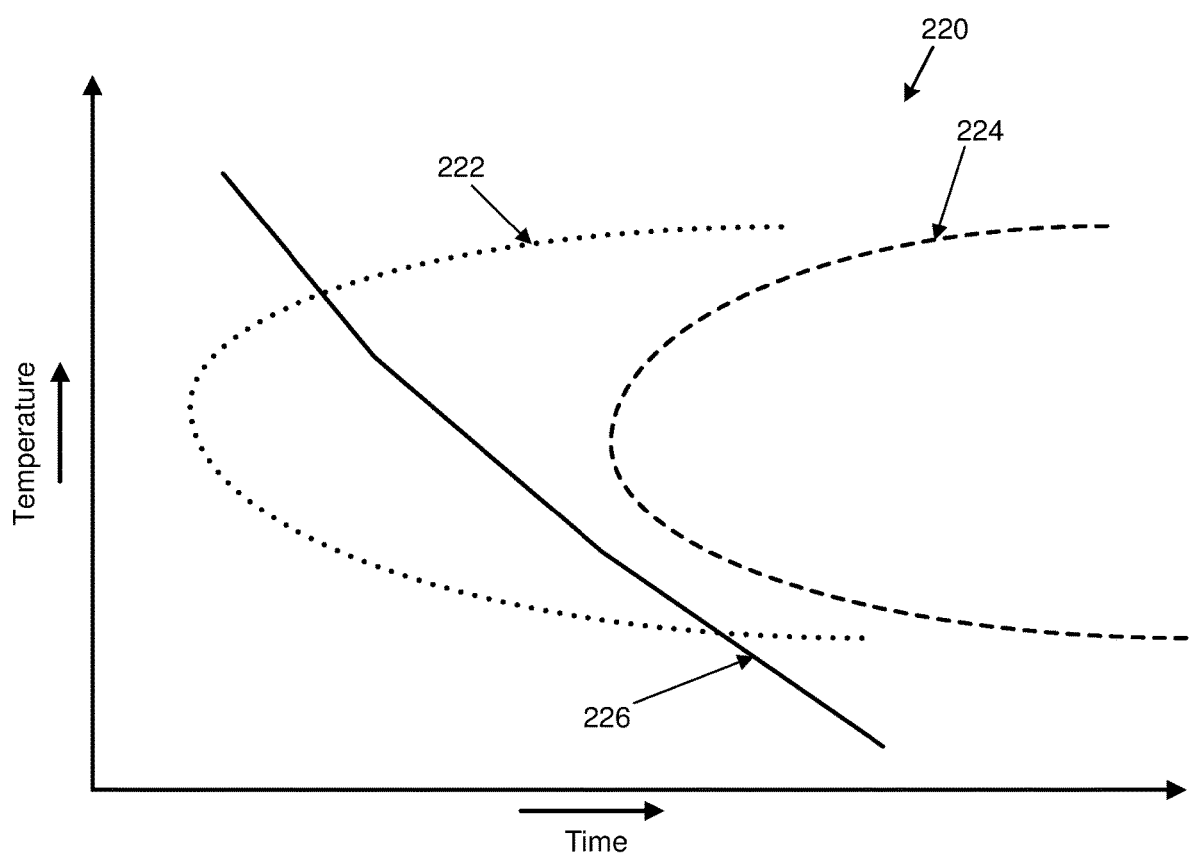
FIG. 14 is a time-temperature phase diagram of a high-strength powder layer of a multi-layered metallic assembly, according to one or more examples of the present disclosure.

Following compression of the multi-layered metallic assembly 130 at 214, the method 200 includes cooling the multi-layered metallic part 131 via the first cooling system 180, the second cooling system 190, and/or other cooling system at 216. Referring to the time-temperature phase diagram 220 of FIG. 14, the multi-layered metallic part 131 is cooled at a cooling rate 226 sufficiently high for the high-strength consolidated layers 135A to form martensite or achieve a martensitic crystallographic phase. The martensitic crystallographic phase is achieved by rapidly quenching the high-strength consolidated layers 135B, while in the austenite ($\gamma$) crystallographic phase, so as not to form cementite ($Fe_3C$). As shown in FIG. 14, the cooling rate 226 is high enough that the crystallographic phase of the high-strength consolidated layers 135A does not cross the phase transformation boundary 224, of the high-strength consolidated layers 135A, between the austenite ($\gamma$) crystallographic phase and an austenite ($\gamma$) and cementite ($Fe_3C$) crystallographic phase. In other words, the cooling rate 226 is selected to prevent the formation of cementite ($Fe_3C$) in the high-strength consolidated layers 135A when cooled. The crystallographic phase of the ductile layers 133A, 133B is less important in some implementations. Accordingly, a cooling rate 226 that results in crossing the phase transformation boundary 222 of the ductile layers 133A, 133B during cooling of the multi-layered metallic part 131 is acceptable as long as the phase transformation boundary 224 is not crossed.

In certain implementations of the method 200, after cooling the multi-layered metallic part 131, the high-strength consolidated layers 135A can be tempered so as to form tempered martensite (e.g., having a tempered martensite crystallographic phase). In view of the elevated hardness of the high-strength consolidated layers 135A, tempering the high-strength consolidated layers 135A can improve the toughness of the high-strength consolidated layers 135A. According to one example, tempering temperatures can be between 200° F. and 500° F.

In yet some implementations, after cooling the multi-layered metallic part 131 at 216, the method 200 includes trimming excess portions of the outer ductile layers 133A from the multi-layered metallic part 131 at 218. For example, in one implementation, the sides 155 of the outer ductile layers 133A can be removed to form a finished multi-layered metallic part 131 as shown in FIG. 8. The excess portions of the outer ductile layers 133A can be trimmed in any of various ways.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The electronic controller and associated modules described in this specification may be implemented as a hardware circuit comprising custom VLSI circuits or gate arrays, off-the-shelf semiconductors such as logic chips, transistors, or other discrete components. The electronic controller may also be implemented in programmable hardware devices such as field programmable gate arrays, programmable array logic, programmable logic devices or the like.

The electronic controller may also be implemented in code and/or software for execution by various types of processors. An identified module of code may, for instance, comprise one or more physical or logical blocks of executable code which may, for instance, be organized as an object, procedure, or function. Nevertheless, the executables of the electronic controller need not be physically located together, but may comprise disparate instructions stored in different locations which, when joined logically together, comprise the electronic controller and achieve the stated purpose for the electronic controller.

Indeed, code of the electronic controller may be a single instruction, or many instructions, and may even be distributed over several different code segments, among different programs, and across several memory devices. Similarly, operational data may be identified and illustrated herein within the electronic controller, and may be embodied in any suitable form and organized within any suitable type of data structure. The operational data may be collected as a single data set, or may be distributed over different locations including over different computer readable storage devices. Where the electronic controller or portions of the electronic controller are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The described features, structures, or characteristics of the embodiments may be combined in any suitable manner. In the above description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A method of forming a multi-layered metallic part, comprising:
    forming a plurality of ductile layers made of a metallic material having a first ductility;
    forming at least one high-strength powder layer made of a powdered metallic material having a second ductility higher than the first ductility;
    assembling the plurality of ductile layers and the at least one high-strength powder layer in an alternating and stacked formation to form a multi-layered metallic assembly; and
    oscillating a crystallographic phase of the powdered metallic material of the at least one high-strength powder layer between a first crystallographic phase and a second crystallographic phase, while the at least one high-strength powder layer is alternatingly stacked with the plurality of ductile layers to form the multi-layered metallic assembly, to consolidate the at least one high-strength powder layer by repeatedly changing the crystallographic phase of the powdered metallic material from the first crystallographic phase to the second crystallographic phase and from the second crystallographic phase to the first crystallographic phase by either repeatedly raising and lowering a temperature of the at least one high-strength powder layer or repeatedly raising and lowering a phase transformation temperature of the at least one high-strength powder layer.

2. The method according to claim 1, wherein oscillating the crystallographic phase of the powdered metallic material of the at least one high-strength powder layer comprises changing a phase transformation temperature of the powdered metallic material of the at least one high-strength powder layer.

3. The method according to claim 2, before oscillating the crystallographic phase, the method further comprises heating the at least one high-strength powder layer to a temperature higher than the phase transformation temperature corresponding with the first crystallographic phase.

4. The method according to claim 3, wherein changing the phase transformation temperature of the powdered metallic material of the at least one high-strength powder layer comprises:
holding constant a temperature of the at least one high-strength powder layer; and
while holding constant the temperature of the at least one high-strength powder layer, applying a magnetic field to the at least one high-strength powder layer to increase the phase transformation temperature of the powdered metallic material higher than the temperature of the at least one high-strength powder layer.

5. The method according to claim 1, wherein oscillating the crystallographic phase of the powdered metallic material of the at least one high-strength powder layer comprises increasing a temperature of the at least one high-strength powder layer above a phase transformation temperature of the powdered metallic material of the at least one high-strength powder layer.

6. The method according to claim 1,
wherein forming the at least one high-strength powder layer comprises forming a plurality of high-strength powder layers; and
wherein assembling comprises assembling the plurality of ductile layers and the plurality of high-strength powder layers in an alternating and stacked formation such that:
two of the plurality of ductile layers comprise outer ductile layers;
the outer ductile layers are joined together to define an enclosed interior cavity of the multi-layered metallic assembly;
the plurality of high-strength powder layers and are sealed within the enclosed interior cavity; and
at least one of the plurality of ductile layers comprises an inner ductile layer sealed within the enclosed interior cavity and interposed between the plurality of high-strength powder layers.

7. The method according to claim 6, further comprising purging the multi-layered metallic assembly of oxide-inducing elements by introducing a gas into the enclosed interior cavity while oscillating the crystallographic phase of the powdered metallic material of the at least one high-strength powder layer between the first crystallographic phase and the second crystallographic phase.

8. The method according to claim 6, further comprising trimming excess portions of the outer ductile layers after oscillating the crystallographic phase of the powdered metallic material of the at least one high-strength powder layer between the first crystallographic phase and the second crystallographic phase.

9. The method according to claim 1, wherein:
the powdered metallic material comprises a steel powder;
the first crystallographic phase is an austenite crystallographic phase;
the second crystallographic phase is a ferrite and cementite crystallographic phase; and
the method further comprises:
heating the high-strength powder layer above a phase transformation temperature corresponding with the austenite crystallographic phase of the steel powder; and
after oscillating the crystallographic phase of the powdered metallic material of the at least one high-strength powder layer between the austenite crystallographic phase and the ferrite and cementite crystallographic phase to form at least one high-strength consolidated layer, cooling the high-strength consolidated layer, while in the austenite crystallographic phase, at a cooling rate sufficient for the at least one high-strength consolidated layer to be in a martensitic crystallographic phase.

10. The method according to claim 9, wherein the phase transformation temperature of the powdered metallic material is increased from between 1414° F. and 1430° F. to at least 1470° F.

11. The method according to claim 9, wherein the steel powder comprises at least 0.80% carbon.

12. The method according to claim 1, wherein:
the plurality of ductile layers and the at least one high-strength powder layer comprise a 3-D sub-feature; and
the 3-D sub-features collectively define a 3-D feature of the multi-layered metallic assembly.

13. The method according to claim 1, wherein:
the plurality of ductile layers and the at least one high-strength powder layer are self-supportive and formed separately from one another; and
assembling the plurality of ductile layers and the at least one high-strength powder layer in an alternating and stacked formation to form a multi-layered metallic assembly comprises stacking the plurality of ductile layers and the at least one high-strength powder layer on top of each other.

14. The method according to claim 1, wherein:
the plurality of ductile layers are self-supportive and formed separately from one another; and
assembling the plurality of ductile layers and the at least one high-strength powder layer in an alternating and stacked formation to form the multi-layered metallic assembly comprises delivering the powdered metallic material into spaces defined between adjacent ductile layers of the plurality of ductile layers.

15. The method according to claim 1, further comprising compressing the multi-layered metallic assembly during or after oscillating the crystallographic phase of the powdered metallic material of the at least one high-strength powder layer between the first crystallographic phase and the second crystallographic phase.

16. The method according to claim 1, wherein the step of oscillating the crystallographic phase of the powdered metallic material of the at least one high-strength powder layer between the first crystallographic phase and the second crystallographic phase helps form a multi-layered metallic armor that comprises:
the plurality of ductile layers made of the metallic material having the first ductility;
a plurality of high-strength consolidated layers made of the metallic material having the second ductility higher than the first ductility;
wherein each high-strength consolidated layer of the plurality of high-strength consolidated layers is sandwiched between two ductile layers of the plurality of ductile layers; and
wherein an interface is defined between each high-strength consolidated layer of the plurality of high-strength consolidated layers and an adjacent ductile layer of the plurality of ductile layers.

17. The method according to claim 16, wherein the plurality of high-strength consolidated layers have a martensite crystallographic phase.

18. The method according to claim 16, wherein the multi-layered metallic armor has a non-planar 3-D shape.

19. The method according to claim 1, wherein the step of oscillating the crystallographic phase of the powdered metallic material of the at least one high-strength powder layer between the first crystallographic phase and the second crystallographic phase is performed by a system for forming a multi-layered metallic part, the system comprising:

- a first portion comprising a first susceptor, the first susceptor comprising a first tool face shaped according to a desired shape of a first surface of the multi-layered metallic part;
- a second portion comprising a second susceptor, the second susceptor comprising a second tool face shaped according to a desired shape of a second surface of the multi-layered metallic part, wherein the first portion and the second portion are movable relative to each other to compress the multi-layered metallic assembly between the first susceptor and the second susceptor, the multi-layered metallic assembly comprising alternating and stacked ductile layers and high-strength powder layers;
- electromagnetic coils to apply a first magnetic field to the first susceptor and the second susceptor, and apply a second magnetic field to the multi-layered metallic assembly between the first susceptor and the second susceptor; and
- a controller operably coupled to the first portion, the second portion, and the electromagnetic coils, wherein the controller is configured to control:
  - a supply of electric power to the electromagnetic coils to generate the first magnetic field to heat the first susceptor and the second susceptor;
  - a supply of electric power to the electromagnetic coils to intermittently generate the second magnetic field to oscillate the crystallographic phase of the high-strength powder layers between the first crystallographic phase and the second crystallographic phase and consolidate the high-strength powder layers; and
- the first portion and the second portion to move relative to each other to compress the multi-layered metallic assembly between the first susceptor and the second susceptor.

20. The method according to claim 12, wherein:

the plurality of ductile layers and the at least one high-strength powder layer are self-supportive and formed separately from one another; and assembling the plurality of ductile layers and the at least one high-strength powder layer in an alternating and stacked formation to form a multi-layered metallic assembly comprises stacking the plurality of ductile layers and the at least one high-strength powder layer on top of each other.

* * * * *